United States Patent
Moon et al.

(10) Patent No.: US 11,382,124 B2
(45) Date of Patent: Jul. 5, 2022

(54) METHOD AND APPARATUS FOR TRANSMITTING OR RECEIVING CONTROL CHANNEL IN COMMUNICATION SYSTEM

(71) Applicant: ELECTRONICS AND TELECOMMUNICATIONS RESEARCH INSTITUTE, Daejeon (KR)

(72) Inventors: Sung Hyun Moon, Daejeon (KR); Jun Hwan Lee, Seoul (KR); Jung Hoon Lee, Daejeon (KR); Ji Hyung Kim, Daejeon (KR); Ju Ho Park, Daejeon (KR); Cheul Soon Kim, Daejeon (KR); Min Hyun Kim, Busan (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/310,162

(22) PCT Filed: Jan. 5, 2018

(86) PCT No.: PCT/KR2018/000219
§ 371 (c)(1),
(2) Date: Dec. 14, 2018

(87) PCT Pub. No.: WO2018/128439
PCT Pub. Date: Jul. 12, 2018

(65) Prior Publication Data
US 2020/0187236 A1    Jun. 11, 2020

(30) Foreign Application Priority Data

Jan. 6, 2017    (KR) .................. 10-2017-0002557
Feb. 6, 2017    (KR) .................. 10-2017-0016430
(Continued)

(51) Int. Cl.
*H04W 72/12*    (2009.01)
*H04L 1/00*    (2006.01)
*H04L 5/00*    (2006.01)

(52) U.S. Cl.
CPC ....... *H04W 72/1289* (2013.01); *H04L 1/0013* (2013.01); *H04L 5/0007* (2013.01);
(Continued)

(58) Field of Classification Search
CPC ......... H04W 72/1289; H04W 72/1273; H04W 72/042; H04W 72/0446; H04W 76/27;
(Continued)

(56) References Cited

U.S. PATENT DOCUMENTS 9,203,566 B2    12/2015    Terry et al.
9,370,000 B2    6/2016    Chun et al.
(Continued)

FOREIGN PATENT DOCUMENTS

JP    2014007670 A    1/2014
JP    2015508956 A    3/2015
(Continued)

OTHER PUBLICATIONS

Huawei, HiSilicon, "Time and frequency resources for DL control channels", 3GPP TSG RAN WG1 Meeting #87, R1-1611210, Reno, USA, Nov. 14-18, 2016.
(Continued)

*Primary Examiner* — Gregory B Sefcheck
*Assistant Examiner* — Joshua Smith
(74) *Attorney, Agent, or Firm* — LRK Patent Law Firm

(57) ABSTRACT

A method and apparatus for transmitting or receiving a control channel in a communication system. A method for transmitting control information by a base station includes: configuring a control resource set including a plurality of REGs; interleaving, on a frequency axis, the plurality of REGs;
(Continued)

REGs included in the control resource set; configuring an REG pool including at least two interleaved REGs; configuring at least one CCE in the REG pool; and transmitting control information through a search space configured by the at least one CCE. Therefore, the present invention improves performance of a communication system.

14 Claims, 26 Drawing Sheets

(30) Foreign Application Priority Data

| Feb. 13, 2017 | (KR) | 10-2017-0019629 |
|---|---|---|
| Jun. 14, 2017 | (KR) | 10-2017-0075102 |
| Aug. 10, 2017 | (KR) | 10-2017-0101401 |
| Oct. 23, 2017 | (KR) | 10-2017-0137758 |
| Jan. 4, 2018 | (KR) | 10-2018-0001365 |

(52) U.S. Cl.
CPC .......... *H04L 5/0044* (2013.01); *H04L 5/0094* (2013.01); *H04W 72/1273* (2013.01)

(58) Field of Classification Search
CPC ... H04L 1/0013; H04L 5/0007; H04L 5/0044; H04L 5/0094; H04L 1/00; H04L 1/1607; H04L 5/0042; H04L 5/0053; H04L 27/2602; H04L 1/0071; H04L 1/0038; H04L 1/0067; H04L 5/0048; H04L 5/0091; H04L 27/2666
See application file for complete search history.

(56) References Cited

U.S. PATENT DOCUMENTS

| 9,419,769 | B2 | 8/2016 | Kim et al. | |
|---|---|---|---|---|
| 9,426,819 | B2 | 8/2016 | Nagata et al. | |
| 2010/0111028 | A1 | 5/2010 | Kim et al. | |
| 2010/0157922 | A1 | 6/2010 | Kim et al. | |
| 2010/0195583 | A1 | 8/2010 | Nory et al. | |
| 2011/0170496 | A1* | 7/2011 | Fong | H04W 52/244 370/329 |
| 2012/0044978 | A1* | 2/2012 | Wang | H04L 25/03904 375/219 |
| 2012/0113917 | A1* | 5/2012 | Gaal | H04L 5/1438 370/329 |
| 2012/0282936 | A1* | 11/2012 | Gao | H04L 5/0053 455/450 |
| 2013/0194931 | A1* | 8/2013 | Lee | H04W 72/04 370/329 |
| 2013/0195047 | A1* | 8/2013 | Koivisto | H04L 1/0061 370/329 |
| 2013/0201926 | A1* | 8/2013 | Nam | H04L 5/0055 370/329 |
| 2013/0301511 | A1 | 11/2013 | Jo et al. | |
| 2014/0050159 | A1* | 2/2014 | Frenne | H04W 72/042 370/329 |
| 2014/0126490 | A1* | 5/2014 | Chen | H04W 72/042 370/329 |
| 2014/0126496 | A1* | 5/2014 | Sayana | H04L 5/0048 370/329 |
| 2014/0204849 | A1 | 7/2014 | Chen et al. | |
| 2014/0321370 | A1* | 10/2014 | Chen | H04L 1/0046 370/329 |
| 2015/0071099 | A1* | 3/2015 | Yi | H04W 72/042 370/252 |
| 2015/0085772 | A1* | 3/2015 | Seo | H04W 24/00 370/329 |
| 2015/0181568 | A1 | 6/2015 | Seo et al. | |
| 2015/0256307 | A1* | 9/2015 | Nagata | H04L 5/0035 370/328 |
| 2015/0334683 | A1* | 11/2015 | Guo | H04W 72/042 370/329 |
| 2015/0341949 | A1* | 11/2015 | Nagata | H04L 1/0013 370/329 |
| 2016/0227548 | A1* | 8/2016 | Nimbalker | H04L 5/0051 |
| 2016/0381668 | A1 | 12/2016 | Lee et al. | |
| 2018/0152923 | A1* | 5/2018 | Xiong | H04L 5/0094 |
| 2018/0287761 | A1* | 10/2018 | You | H04L 5/00 |
| 2018/0375636 | A1* | 12/2018 | You | H04L 5/0053 |
| 2019/0045487 | A1* | 2/2019 | You | H04W 72/0446 |
| 2019/0349925 | A1* | 11/2019 | Tang | H04W 72/0446 |

FOREIGN PATENT DOCUMENTS

| JP | 2016510540 A | 4/2016 |
|---|---|---|
| KR | 10-2015-0107778 A1 | 9/2015 |
| WO | 2013112972 A1 | 8/2013 |
| WO | 2013/129883 A1 | 9/2013 |
| WO | 2014/113138 A1 | 7/2014 |
| WO | 2014113138 A1 | 7/2014 |

OTHER PUBLICATIONS

Huawei et al., "Time and frequency resources for DL control channels", R1-1611210, 3GPP TSG RAN WG1 Meeting #87 Reno, USA, Nov. 5, 2016.

LG Electronics, "Discussion on CSS and USS in NR system", R1-1611837, 3GPP TSG RAN WG1 Meeting #87, Reno, USA, Nov. 5, 2016.

Sony, "Time Domain Structure of DL Physical Control Channel for NR", 3GPP TSG RAN WG1 Meeting #87, R1-1612891, Reno, Nevada, USA Nov. 14-18, 2016.

LG Electronics, "Discussions on data and control multiplexing for NR", 3GPP TSG RAN WG1 Meeting #87, R1-1611833, Reno, USA Nov. 14-18, 2016.

* cited by examiner

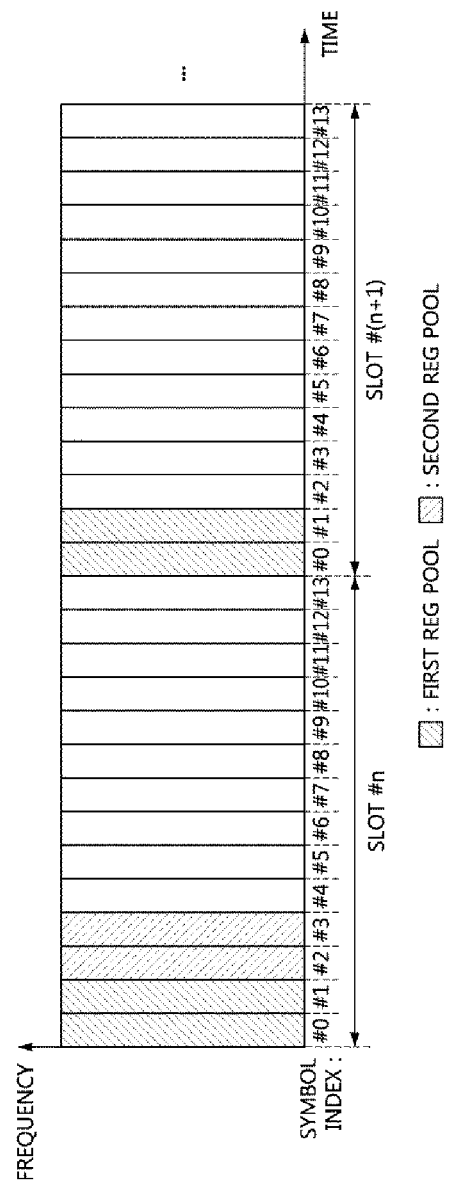

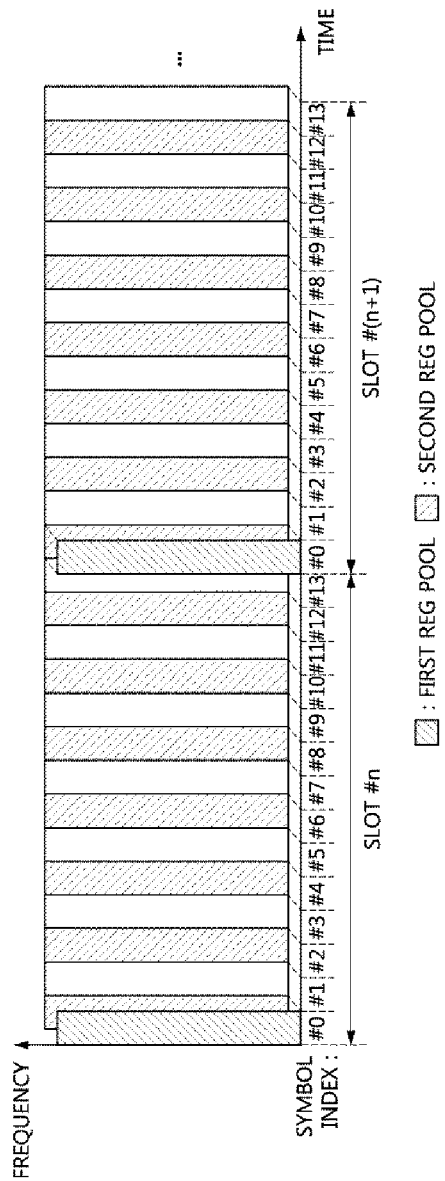

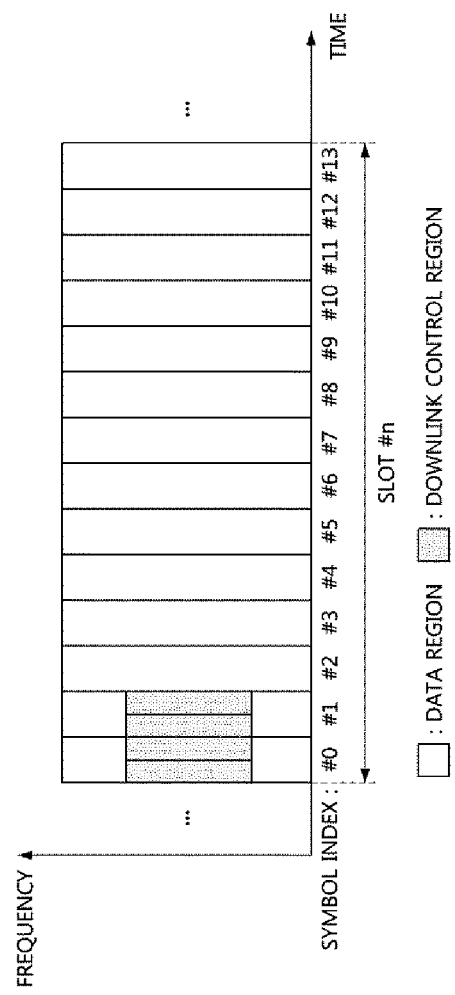

☐ : DATA REGION  ▨ : DOWNLINK CONTROL REGION

☐ : DATA REGION  ▨ : DOWNLINK CONTROL REGION

METHOD AND APPARATUS FOR TRANSMITTING OR RECEIVING CONTROL CHANNEL IN COMMUNICATION SYSTEM

CROSS-REFERENCE TO RELATED APPLICATIONS

The present application is a U.S. National Phase entry from International Application No. PCT/KR2018/000219, filed Jan. 5, 2018, which claims priority to Korean Patent Application Nos. 10-2017-0002557, filed Jan. 6, 2017, 10-2017-0016430, filed Feb. 6, 2017, 10-2017-0019629, filed Feb. 13, 2017, 10-2017-0075102, filed Jun. 14, 2017, 10-2017-0101401, filed Aug. 10, 2017, 10-2017-0137758, filed Oct. 23, 2017, and 10-2018-0001365, filed Jan. 4, 2018, the disclosures of which are incorporated by reference herein in their entireties.

BACKGROUND

1. Technical Field

The present invention relates to techniques for transmitting and receiving control channels in a communication system, and more particularly, to techniques for configuring, transmitting, and receiving downlink control channels.

2. Description of Related Art

A communication system (e.g., a 'new radio (NR)') using a higher frequency band (e.g., a frequency band of 6 GHz or higher) than a frequency band (e.g., a frequency band of 6 GHz or lower) of a long term evolution (LTE) based communication system (or, a LTE-A based communication system) is being considered for processing of soaring wireless data. The NR can support not only the 6 GHz or higher frequency band but also the 6 GHz or lower frequency band, and can support various communication services and scenarios compared to the LTE. Also, the requirements of the NR may include an enhanced mobile broadBand (eMBB), an ultra reliable low latency communication (URLLC), a massive machine type communication (mMTC), and the like.

Meanwhile, a new transmission scheme for the communication system such as the NR, which supports a wide frequency band and a wide range of services, is required, and in particular, a downlink control channel configuration method, a downlink control channel transmission and reception method, and the like are required for stably maintaining a radio link quality.

SUMMARY

In order to solve the above-described problem, the present invention is directed to providing a method and an apparatus for transmitting and receiving downlink control channels in a communication system.

A control information transmission method performed in a base station, according to a first embodiment of the present invention for achieving the above-described objective, may comprise configuring a control resource set including a plurality of resource element groups (REGs); interleaving the plurality of REGs included in the control resource set in a frequency domain; configuring an REG pool including at least two of the interleaved REGs; configuring at least one control channel element (CCE) in the REG pool; and transmitting control information through a search space composed of the at least one CCE.

Here, each of the plurality of REGs may comprise 12 subcarriers and 1 orthogonal frequency division multiplexing (OFDM) symbol.

Here, information on a time-frequency resource in which the control resource set is configured may be transmitted to a terminal through a signaling procedure.

Here, the control resource set may be a base control resource set or an additional control resource set, the base control resource set being used for transmitting control information needed for an initial access procedure, and the additional control resource set being used for transmitting control information needed for a terminal in a radio resource control (RRC) connected state.

Here, the base control resource set may be configured within a minimum system bandwidth, and the additional control resource set may be configured within an entire system bandwidth.

Here, an index of each of the at least two of the interleaved REGs included in the REG pool may be translated to a global index which is unique in the REG pool.

Here, the CCE may include REGs having consecutive global indexes.

Here, the search space may be classified into a common search space and a terminal-specific search space, the common search space being used for all terminals belonging to a coverage of the base station, and the terminal-specific search space being used for a specific terminal among terminals belonging to the coverage of the base station.

Here, when two CCEs are configured within the REG pool, one of the two CCEs may be used as the common search space, and the other of the two CCEs may be used as the terminal-specific search space.

Here, a physical downlink common control channel (PDCCCH) used for transmitting a common downlink control information (DCI) may be configured in the control resource set, and the PDCCCH may be configured not to overlap with the search space.

Here, a preconfigured region in the control resource set may be used for a data channel, and scheduling information for the data channel may be transmitted through the search space.

A control information reception method performed in a terminal, according to a second embodiment of the present invention for achieving the above-described objective, may comprise receiving configuration information of a control resource set including a plurality of resource element groups (REGs) from a base station; identifying a search space in the control resource set based on the configuration information; and receiving control information from the base station by performing monitoring on the search space, wherein the plurality of REGs included in the control resource set are interleaved on a frequency domain, an REG pool is configured to include at least two of the interleaved REGs, and the search space includes at least one control channel element (CCE) configured in the REG pool.

Here, the control resource set may be a base control resource set or an additional control resource set, the base control resource set being used for transmitting control information needed for an initial access procedure, and the additional control resource set being used for transmitting control information needed for a terminal in a radio resource control (RRC) connected state.

Here, the search space may be classified into a common search space and a terminal-specific search space, the common search space being used for all terminals belonging to a coverage of the base station, and the terminal-specific search space being used for a specific terminal among terminals belonging to the coverage of the base station.

Here, a physical downlink common control channel (PDCCCH) used for transmitting a common downlink control information (DCI) may be configured in the control resource set, and the PDCCCH may be configured not to overlap with the search space.

Here, a preconfigured region in the control resource set may be used for a data channel, and scheduling information for the data channel may be transmitted through the search space.

A base station for transmitting control information, according to a third embodiment of the present invention for achieving the above-described objective, may comprise a processor and a memory storing at least one instruction executed by the processor, and the at least one instruction may be configured to configure a control resource set including a plurality of resource element groups (REGs); interleave the plurality of REGs included in the control resource set in a frequency domain; configure an REG pool including at least two of the interleaved REGs; configure at least one control channel element (CCE) in the REG pool; and transmit control information through a search space composed of the at least one CCE.

Here, the control resource set may be a base control resource set or an additional control resource set, the base control resource set being used for transmitting control information needed for an initial access procedure, and the additional control resource set being used for transmitting control information needed for a terminal in a radio resource control (RRC) connected state.

Here, an index of each of the at least two of the interleaved REGs included in the REG pool may be translated to a global index which is unique in the REG pool.

Here, a physical downlink common control channel (PDCCCH) used for transmitting a common downlink control information (DCI) may be configured in the control resource set, and the PDCCCH may be configured not to overlap with the search space.

Advantageous Effects

According to the present invention, the downlink control channel for the communication system can be efficiently configured. That is, when the downlink control channel is configured according to the embodiments of the present invention, the efficiency of resources can be improved, the transmission capacity of the downlink control channel can be increased, and the reception performance of the downlink control channel can be improved. Therefore, the performance of the communication system can be improved.

BRIEF DESCRIPTION OF DRAWINGS

FIG. 4D is a conceptual diagram illustrating a fourth embodiment of a REG pool in a control resource set;

FIG. 4E is a conceptual diagram illustrating a fifth embodiment of a REG pool in a control resource set;

FIG. 12 is a conceptual diagram illustrating a first embodiment of a method of configuring a data region and a control region;

DETAILED DESCRIPTION OF THE INVENTION

Figure 1:
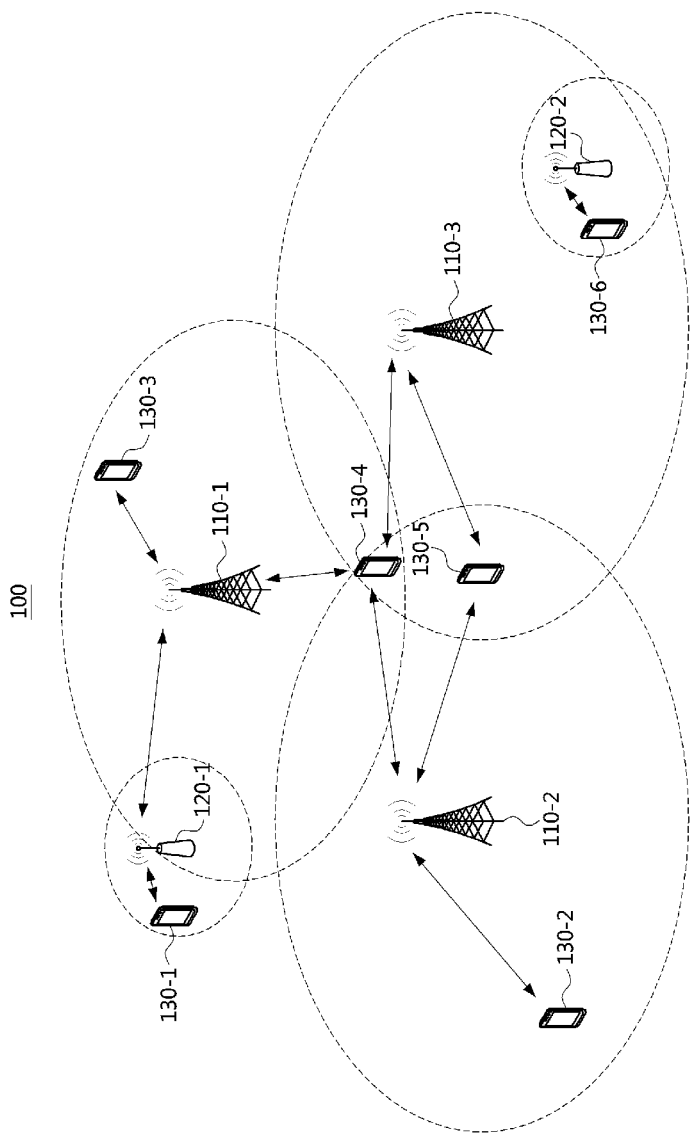
FIG. 1 is a conceptual diagram illustrating a first embodiment of a communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

A communication system to which embodiments of the present disclosure are applied will be described. The communication system may be the 4G communication system (e.g., the long-term evolution (LTE) communication system, the LTE-Advance (LTE-A) communication system, or the like), the 5G communication system (e.g. the NR communication system), or the like. The 4G communication system may support communications in a frequency band of 6 GHz or below, and the 5G communication system may support communications in a frequency band of 6 GHz or above as well as the frequency band of 6 GHz or below. The communication systems to which the embodiments according to the present disclosure are applied are not restricted to what will be described below, and the embodiments according to the present disclosure may be applied to various communication systems. Here, the term 'communication system' may be used with the same meaning as the term 'communication network'.

FIG. 1 is a conceptual diagram illustrating a first embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further include a core network (e.g., a serving gateway (S-GW), a packet data network (PDN) gateway (P-GW), a mobility management entity (MME), or the like).

The plurality of communication nodes may support 4th generation (4G) communication (e.g., long term evolution (LTE), LTE-advanced (LTE-A)), 5th generation (5G) communication, or the like. The 4G communication may be performed in a frequency band below 6 gigahertz (GHz), and the 5G communication may be performed in a frequency band above 6 GHz. For example, for the 4G and 5G communications, the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a cyclic prefix OFDM (CP-OFDM) based communication protocol, a discrete Fourier transform spread OFDM (DFT-s-OFDM) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, and a space division multiple access (SDMA) based communication protocol. Each of the plurality of communication nodes may have the following structure.

Figure 2:
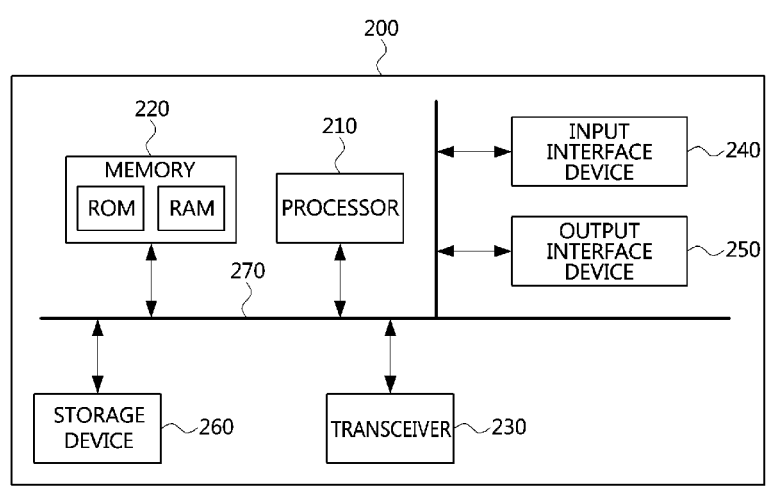
FIG. 2 is a block diagram illustrating a first embodiment of a communication node constituting a communication system.

FIG. 2 is a block diagram illustrating a first embodiment of a communication node constituting a cellular communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a gNB, an ng-eNB, a high reliability base station (HR-BS), a base transceiver station (BTS), a radio base station, a radio transceiver, an access point, an access node, a radio access station (RAS), a mobile multi-hop relay base station (MMR-BS), a relay station (RS), an advanced relay station (ARS), a high reliability relay station (HR-RS), a home NodeB (HNB), a home eNodeB (HeNB), a road side unit (RSU), a radio remote head (RRH), a transmission point (TP), a transmission and reception point (TRP), or the like.

Each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of things (IoT) communication, dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, the communication system may support a frequency division duplex (FDD) scheme, a time division duplex (TDD) scheme, and the like. Also, the communication system (e.g., NR) may support a variety of numerologies (e.g., various waveform parameter sets) as shown in Table 1 below. Table 1 may represent numerologies to which normal cyclic prefixes (CPs) defined in the LTE (e.g., the same CP overhead as the LTE) are applied, and when the CP-OFDM is used, each numerology may be defined with a subcarrier spacing and a CP length. For the purpose of reducing implementation complexity and effectively supporting operations (e.g., CA operation, DC operation, multiplexing operation of heterogeneous numerologies in one carrier, and the like), exponential relations of 2 may be established between the subcarrier spacings in Table 1.

TABLE 1

|  | Numerology Index | | | | | |
| --- | --- | --- | --- | --- | --- | --- |
|  | #1 | #2 | #3 | #4 | #5 | #6 |
| Subcarrier spacing | 15 kHz | 30 kHz | 60 kHz | 120 kHz | 240 kHz | 480 kHz |
| OFDM symbol length (μs) | 66.7 | 33.3 | 16.7 | 8.3 | 4.2 | 2.1 |
| CP length (μs) | 4.76 | 2.38 | 1.19 | 0.60 | 0.30 | 0.15 |
| The number of OFDM symbols in 1 ms | 14 | 28 | 56 | 112 | 224 | 448 |

The numerology #1 may be suitable for a scenario where LTE and NR share the same frequency band in the same area. The numerology may be selectively used depending on an operation frequency band, a target service, a scenario, and the like. Also, a specific numerology may be used for specific signals or for specific channels. For example, numerologies (i.e., numerologies #1 to #3) corresponding to a subcarrier spacing of 60 kHz or less may be used for a frequency band of 6 GHz or less, and numerologies (i.e., numerologies #3 to #6) corresponding to a subcarrier spacing of 60 kHz or higher may be used for a frequency band of 6 GHz or higher. Also, a numerology (i.e., numerology #1) corresponding to a subcarrier spacing of 15 kHz may be used for an enhanced mobile broadband (eMBB) service, and a numerology (i.e., numerology #3) corresponding to a subcarrier spacing of 60 kHz may be used for an ultra-reliable low latency communication (URLLC) service.

One numerology may be used for one cell or one carrier. Also, one numerology may be used for a specific time-frequency resource in one carrier. The heterogeneous numerologies may be used for different operation frequency bands. Also, the heterogeneous numerologies may be used to support different services (or requirements) within the same frequency band (e.g., the same carrier). A numerology having the subcarrier spacing smaller than that of the numerology #1 may be used to support a massive machine type communication (mMTC) service, a multimedia broadcast multicast service (MBMS) service, or the like. For example, a numerology having a subcarrier spacing of 7.5 kHz or 3.75 kHz may be considered.

On the other hand, a frame structure for the NR may be constituted as follows. In the NR, a building block on the time domain may include a subframe, a slot, a minislot, an OFDM symbol, and the like. In the embodiments to be described below, an 'OFDM symbol' may be replaced with a symbol based on another waveform technology. The length of the subframe may be 1 ms regardless of the subcarrier spacing. The slot may comprise 14 consecutive OFDM symbols. Therefore, the length of the slot may be inversely proportional to the subcarrier spacing, unlike the length of the subframe.

A control channel (e.g., a downlink control channel and an uplink control channel) and a data channel (e.g., a downlink data channel and an uplink data channel) may be configured in each of the slots, and the control channel may be disposed in at least one of a front region and a rear region of the corresponding slot. In the case that a slot-based scheduling is used, one slot may be a minimum scheduling unit, and in this case, the base station may transmit scheduling information to the terminal through a downlink control channel of each of the slots.

The slot type may be classified into a downlink slot including a downlink interval, an uplink slot including an uplink interval, a bi-directional slot including a downlink interval and an uplink interval, and the like. A guard interval may be located between the downlink interval and the uplink interval in the bi-directional slot, and the length of the guard interval may be set to be larger than a sum of twice a propagation delay and a delay spread. A plurality of slots may be aggregated to transmit one data packet or one transport block (TB). Alternatively, a plurality of slots may be aggregated to transmit a plurality of data packets or a plurality of transport blocks.

In the NR, a scheduling based on a minislot with a length shorter than the slot may be used. For example, a minislot may be used for supporting an aggressive time division multiplexing (TDM) for analog or hybrid beamforming in a frequency band of 6 GHz or above, partial slot transmission in an unlicensed band, the partial slot transmission in a frequency band where NR and LTE coexist, the URLLC service, and the like.

In order to support various embodiments, the length and starting point (e.g., position) of the minislot may be flexibly defined. For example, when one slot includes M OFDM symbols, the minislot may be configured to include 1 to (M−1) OFDM symbols. Here, M may be an integer of 2 or more. The length and starting point of the minislot may be explicitly configured for the terminal. In this case, the base station may inform the terminal of the length and starting time of the minislot. Alternatively, the minislot-based scheduling may be operated by appropriately setting a monitoring period for the control channel, the-time domain resource size of the scheduled data channel, or the like without explicitly configuring the length and the starting time point of the minislot in the terminal.

In the LTE, a basic unit of resource allocation may be a physical resource block (PRB) pair, and one PRB pair may include 2 consecutive slots in the time domain and 12 consecutive subcarriers in the frequency domain. On the other hand, in the NR, a PRB may be used as a resource allocation unit in the frequency domain. In this case, one PRB may include 12 subcarriers regardless of the numerology. Thus, the bandwidth occupied by one PRB may be proportional to the subcarrier spacing of the numerology. For example, the bandwidth occupied by one PRB for the case of using the numerology #3 corresponding to the subcarrier spacing of 60 kHz may be four times the bandwidth occupied by one PRB for the case of using the numerology #1 corresponding the subcarrier spacing of 15 kHz.

Hereinafter, a method of configuring a downlink control channel, a method of transmitting and receiving a downlink control channel, a method of configuring a reference signal for decoding a downlink control channel, etc., in the NR will be described. Even when a method (e.g., transmission or reception of a signal) performed at the first communication node among the communication nodes is described, the corresponding second communication node may perform a method (e.g., reception or transmission of the signal) corresponding to the method performed at the first communication node. That is, when an operation of the terminal is described, the corresponding base station may perform an operation corresponding to the operation of the terminal. Conversely, when an operation of the base station is described, the corresponding terminal may perform an operation corresponding to the operation of the base station.

The embodiments described below may be applied to other communication systems (e.g., LTE) as well as the NR. In the following embodiments, a control channel may indicate at least one of a downlink control channel (e.g., PDCCH) and an uplink control channel (e.g., PUCCH), and a data channel may indicate at least one of a downlink data channel (e.g., PDSCH) and an uplink data channel (e.g., PUSCH).

In the NR, a terminal may receive a PDCCH by performing a blind decoding operation. In this case, the terminal performs the blind decoding operation on PDCCH candidates (e.g., candidate resource regions through which a PDCCH may be transmitted) in a predefined search space to determine whether there is a PDCCH for itself, and may receive the PDCCH when there is the PDCCH for itself. Here, the search space may be referred to as a 'control channel search space' or a 'PDCCH search space', and may be a set of the PDCCH candidates. A control channel element (CCE) may be a minimum resource region in which one PDCCH can be transmitted. One PDCCH may be transmitted through one CCE. Alternatively, one PDCCH may be transmitted via aggregated CCEs. As a CCE aggregation level is higher, one PDCCH may occupy more resource regions, and in this case, a PDCCH reception performance may be improved by lowering a coding rate of the PDCCH.

At least one PDCCH candidate may be configured in each of the CCE aggregation levels. For example, in the LTE, the CCE aggregation level may be set to 1, 2, 4, 8, or the like, and a fixed number of PDCCH candidates for each of the CCE aggregation levels may be defined. In the LTE, a common search space (CSS) may be a common search space that all terminals monitor and may support the CCE aggregation levels 4 and 8. A terminal-specific search space (i.e., UE-specific search space) may be a search space configured for each terminal and may support the CCE aggregation levels 1, 2, 4, and 8.

In the NR, a basic unit of the downlink control channel may be a resource element group (REG). The REG may be composed of 1 PRB (e.g., 12 subcarriers) in the frequency domain and 1 OFDM symbol in the time domain. Thus, one REG may contain 12 resource elements (REs). The REG may include REs to which a demodulation reference signal (DMRS) used for decoding the downlink control channel is mapped. In this case, REs to which the downlink control channel can be mapped in one REG may be REs other than the REs to which the DMRS is mapped among the 12 REs. One CCE may include at least one REG. All CCEs may include the same number of REGs. Alternatively, the CCEs may include a different number of REGs.

Meanwhile, the terminal may receive downlink control information (DCI) through the PDCCH. The DCI may include a common DCI received by a plurality of terminals in common and a terminal-specific (i.e., UE-specific) DCI received by a specific terminal. For example, the common DCI may include resource allocation information for transmission of system information (SI), power control information, slot configuration information (e.g., slot type and slot structure), TDD uplink (UL)/downlink (DL) configuration information, control channel configuration information, random access response related information, paging related information, and the like. The UE-specific DCI may include uplink scheduling information, downlink scheduling information, and the like.

In the LTE, the PDCCH resource region may be defined in the entire system bandwidth, and the PDCCH may be distributed in the wide frequency region through interleaving in the time-frequency domain. On the other hand, in the NR, for the sake of forward compatibility, a case where a specific signal or a specific channel is transmitted in the entire system bandwidth and a case where a specific signal or a specific channel is always transmitted periodically may be minimized. For example, in the NR, the PDCCH may be transmitted over a specific limited frequency band, and when necessary, resources for the PDCCH may be additionally configured in other frequency bands. That is, in terms of the system and the terminal, a plurality of resource regions for the PDCCH may be configured.

Control Resource Set (CORESET)

On the other hand, in the NR, a control resource set may be configured, and the control resource set may include a PDCCH search space (i.e., a resource region on which the terminal performs a blind decoding operation for the PDCCH). The control resource set may be referred to as a 'CORESET'. The control resource set may be composed of a plurality of PRBs in the frequency domain and a plurality of OFDM symbols in the time domain. As an example, the control resource set may consist of a limited number of PRBs in the frequency domain and a limited number of OFDM symbols in the time domain. As another example, the control resource set may comprise a limited number of PRBs in the frequency domain and an entire time resource in the time domain (e.g., all OFDM symbols in the time domain). In this case, configuration information of the control resource set transmitted to the terminal by the base station may include frequency domain resource information and may not include time domain resource information.

The control resource set may include a plurality of REGs. The control resource set may include at least one CCE. The PRBs belonging to one control resource set may be continuous or discontinuous in the frequency domain. At least one control resource set may be configured for a terminal. When a plurality of control resource sets are configured for a terminal, one DCI may be transmitted in one control resource set.

The control resource sets may be classified into a base control resource set and an additional control resource set. The base control resource set may be a resource region which is initially monitored by the terminal performing an initial access procedure in a radio resource control idle state (i.e., RRC_IDLE state) to receive a PDCCH. The terminal in an RRC connected state (i.e., RRC_CONNECTED state) as well as the terminal in the RRC_IDLE state may perform monitoring on the base control resource set. The base control resource set may be configured to the terminal through system information transmitted through a physical broadcast channel (PBCH) or another channel. The additional control resource set may be configured to the terminal through a signaling procedure (e.g., an RRC signaling procedure). Therefore, the additional control resource set may be valid for a terminal in the RRC_CONNECTED state and may be configured for a specific terminal.

The base control resource set may be defined within the minimum system bandwidth that is commonly supported by all the terminals performing the initial access procedure, and the additional control resource set may be configured within a frequency band that is wider than the frequency band to which the base control resource set is allocated. For example, the additional control resource set may be configured in any frequency band within the bandwidth of the operation frequency of the terminal (e.g., a bandwidth part). The operation frequency (e.g., bandwidth part) of the terminal may be configured within the system bandwidth or an RF channel bandwidth of the terminal. At least one base control resource set may be configured in a cell or a carrier in a standalone mode in order to support the terminal in the RRC_IDLE state. The search space belonging to the base control resource set may be referred to as a 'base search space', and the search space belonging to the additional control resource set may be referred to as an 'additional search space'.

Figure 3:
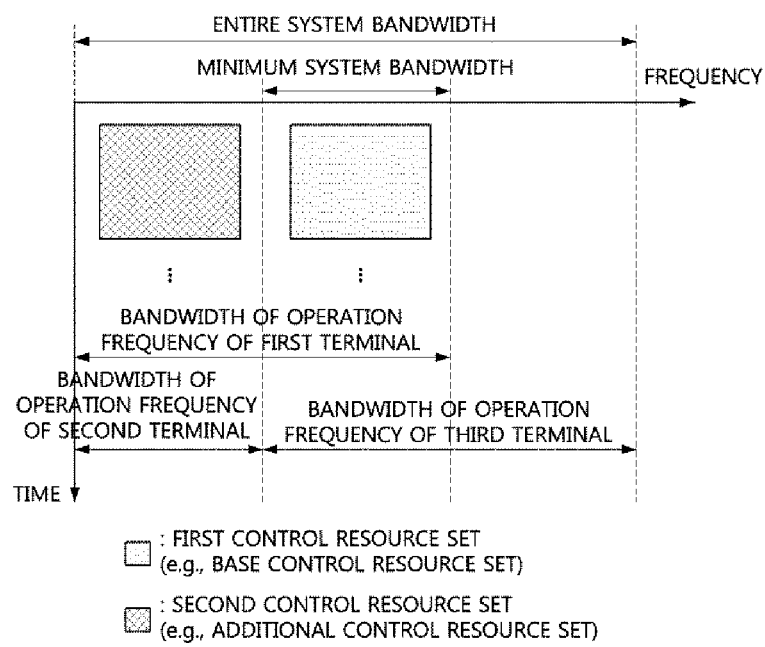
FIG. 3 is a conceptual diagram illustrating a first embodiment of a control resource set.

FIG. 3 is a conceptual diagram illustrating a first embodiment of a control resource set.

Referring to FIG. 3, a plurality of control resource sets may be configured within one carrier (e.g., entire system bandwidth). A first control resource set may be a base control resource set, and a second control resource set may be an additional control resource set. The bandwidth of the first control resource set may be set so as not to exceed the minimum system bandwidth of the terminals described above.

Since the first control resource set and the second control resource set are configured within the bandwidth of the operation frequency of a first terminal, the first terminal may perform monitoring on at least one of the first control resource set and the second control resource set. Since the second control resource set is configured within the bandwidth of the operation frequency of a second terminal, the second terminal may perform monitoring on the second control resource set. Since the first control resource set is configured within the bandwidth of the operation frequency of a third terminal, the third terminal may perform monitoring on the first control resource set.

Meanwhile, the common DCI may be transmitted periodically or aperiodically through the base control resource set. In this case, even after the initial access procedure is completed, the terminal may perform monitoring on the base control resource set to receive the common DCI. However, a terminal transiting from the RRC_IDLE state to the RRC_CONNECTED state may operate in a frequency band other than the frequency band in which the base control resource set is configured. In this case, the terminal may retune the operation frequency band at each monitoring time of the base control resource set to monitor the base control resource set. Alternatively, the terminal may be configured to have an additional control resource set for transmission of the common DCI within its operation frequency band.

Common DCI

The base station may inform the terminal of a transmission cycle of the common DCI, a position of a transmission slot of the common DCI (e.g., slot index), and the like through a signaling procedure (e.g., RRC signaling procedure). The transmission cycle of the common DCI may be indicated by the number of slots. When the common DCI is not received, the terminal may not be able to successfully perform not only the reception operation of the PDCCH but also other operations. For example, the terminal that has not received the common DCI (e.g., slot configuration information) may not receive a PDSCH because it does not know information on the downlink interval of the slot. Also, the terminal that has not received the common DCI (e.g., slot configuration information) may transmit an uplink signal and a channel in a wrong period because it does not know information on the uplink interval of the slot. In this case, the base station may not receive the uplink signal and the channel from the terminal.

In order to solve this problem, through a UE-specific DCI, the base station may inform the terminal of transmission period information of a downlink data channel (e.g., PDSCH), transmission period information of an uplink data channel (e.g., PUSCH), and the like. Here, the transmission period information may include a starting symbol index and an ending symbol index of a transmission period, or may include the starting symbol index and the length of the transmission period. In this case, the terminal may receive the downlink data channel in the transmission period indicated by the UE-specific DCI, and may transmit the uplink data channel in the transmission period indicated by the UE-specific DCI. Therefore, the problem caused by the reception failure of the common DCI may be solved.

Meanwhile, in the NR, a multi-antenna based beamforming scheme may be used to compensate for a coverage loss due to high signal attenuation in the high frequency band. In order to transmit common information or broadcast information to an entire coverage of a cell (or a sector), a beam sweeping scheme may be used in which a plurality of beams are sequentially transmitted in a plurality of time intervals. The beam sweeping scheme may be applied for the transmission of common DCI. In an environment where the beamforming scheme (e.g., beam sweeping scheme) is used, the operation of the terminal may be configured not to depend on the common DCI. For this, an RRC signaling procedure for configuring the slot over which the common DCI is transmitted may be performed if the base station desires.

The common DCI may be transmitted via a PDCCH or another channel (hereinafter referred to as a 'physical downlink common control channel (PDCCCH)'). The PDCCCH may be configured to be similar to a physical control format indicator channel (PCFICH) defined in the LTE. The coding and decoding procedure and the resource structure for the PDCCCH may be configured differently from the coding and decoding procedure and the resource structure for the PDCCH, and the PDCCCH may be received from a fixed resource without performing the blind decoding operation. Since the PDCCCH can be received without performing the blind decoding operation, a time required for reception of the PDCCCH may be reduced. Configuration information of a slot through which the PDCCCH is transmitted (hereinafter referred to as a 'PDCCCH slot') may be transmitted through a system information transmission procedure (e.g., signaling procedure), and in this case, the terminal in the RRC_CONNECTED state as well as the terminal in the RRC_IDLE state may receive the configuration information of the PDCCCH slot.

Meanwhile, when the common DCI is transmitted via the PDCCH (hereinafter referred to as a 'PDCCH based common DCI transmission scheme'), the terminal may obtain the common DCI by performing the blind decoding operation. In this case, in order to reduce the complexity of the blind decoding operation on the common DCI, the search space for the common DCI may be limited to some search space (e.g., common search space) among the entire search spaces. Also, the common DCI may be located in a front region of the slot.

In the PDCCH based common DCI transmission scheme, the PDCCCH may not be used. When several types of common DCIs are defined, the number of common DCIs transmitted in one slot may be variable. In this case, various types of common DCIs may be flexibly scheduled through a plurality of PDCCH candidates. Also, the PDCCH based common DCI transmission scheme may provide forward compatibility. Even when a new common DCI is introduced in the future, the new common DCI may be transmitted through the same PDCCH (e.g., search space) without further defining a separate channel for transmitting the new common DCI.

Since the PDCCH resource region is shared by the common DCI or other DCIs, there may be no resource loss even when the base station does not transmit the corresponding common DCI through the slot through which the common DCI is transmitted (or the candidate slot through which the common DCI can be transmitted). When the base station does not transmit the common DCI in the slot or the candidate slot, the terminal may perform related operations using predefined default information (or, preconfigured default information). Alternatively, the terminal may perform the related operations using a previously received common DCI. In term of the reception delay or reception complexity, the reception delay of the common DCI may be minimized when the search space through which the common DCI is transmitted is placed in the front region of the slot. Also, when a specific common DCI is configured to be transmitted through a specific PDCCH candidate (e.g., a set of specific CCEs), the reception complexity may be reduced since the terminal can receive the specific common DCI without the blind decoding operation.

For example, the specific common DCI may be transmitted through a PDCCH candidate K of a CCE aggregation level L among PDCCH candidates constituting a search space (hereinafter referred to as a 'Method 200-1'). The Method 200-1 may be applied to the slot through which the specific common DCI is transmitted, and the PDCCH candidate may be used for general purposes in the remaining slots. In this case, the specific common DCI may include a slot format indicator (SFI) described below (e.g., information indicating a slot format used in the NR). Alternatively, the specific common DCI may be a preemption indicator of the NR. Also, the search space for the specific common DCI may be the common search space or the UE-specific search space.

On the other hand, the terminal may monitor only the specific common DCI in a dedicated PDCCH candidate in the slot through which the specific common DCI is transmitted (or, the candidate slot through which the specific common DCI can be transmitted) (hereinafter, referred to as a 'Method 200-2'). The base station may be allowed not to transmit the specific common DCI in the slot (or, candidate slot). According to Method 200-2, when the base station does not transmit the specific common DCI through the dedicated PDCCH candidate, resources of the dedicated PDCCH candidate may be wasted. In order to solve this problem, the terminal may monitor not only the specific common DCI but also other DCIs on the PDCCH candidate (e.g., dedicated PDCCH candidate) (hereinafter referred to as a 'Method 200-3'). For Methods 200-1 to 200-3, the base station may inform the terminal of the position information (e.g., L, K) of the search space for monitoring the common DCI through a signaling procedure (e.g., RRC signaling procedure).

Information Included in a Common DCI

The common DCI may include slot configuration information (e.g., slot format indicator). The slot configuration information may include information indicating each of a downlink interval, a guard interval, and an uplink interval of a slot (e.g., position information of OFDM symbols (e.g., OFDM symbol set) belonging to each of the downlink interval, the guard interval, and the uplink interval). The guard interval may be an unknown interval for which a transmission direction (e.g., uplink or downlink direction) is not defined. The terminal may not perform transmission and reception operations in the unknown interval until the transmission direction is determined by overriding the unknown interval by other signaling.

A transmission cycle of the slot configuration information may be set to N slots. N may be an integer of 1 or more. For coexistence of the NR and the LTE in the same frequency band, the transmission cycle of the slot configuration information may be set to 10 ms, 20 ms, 40 ms, or 80 ms, which is a transmission cycle of reconfiguration information for UL/DL configuration in the LTE. When N>1, the slot configuration information may be applied to N consecutive slots. When X bits are needed to indicate the structure of one slot, a maximum of 'N×X' bits may be needed to indicate the structures of N slots.

Also, the common DCI may include reserved resource information. The reserved resource information may be used to indicate that a specific time-frequency resource is reserved in a slot (or slot group). The terminal receiving the reserved resource information may determine that a specific signal and a specific channel for itself are not transmitted through the time-frequency resource indicated by the reserved resource information (hereinafter referred to as a 'Method 300-1'). Alternatively, the terminal receiving the reserved resource information may determine that no signal or channel for itself is transmitted through the time-frequency resource indicated by the reserved resource information (hereinafter referred to as a 'Method 300-2').

In Method 300-1, the specific signal may be a signal transmitted over a slot, and the specific channel may be a PDSCH, PUSCH, PUCCH, etc. transmitted over a slot. Also, in Method 300-1, each of the specific signal and the specific channel may not include a signal and a channel transmitted through a minislot. In this case, the base station may reserve a specific time-frequency resource using the common DCI and perform minislot-based transmission using the reserved specific time-frequency resource. Also, the reserved resource information may be used to protect transmission of downlink and uplink reference signals. For example, the time-frequency resource indicated by the reserved resource information may be used for transmission such as CSI-RS, sounding reference signal (SRS), and the like.

It may be preferable that the information included in the common DCI (e.g., slot configuration information, reserved resource information, etc.) described above is received at the earliest time in the terminal side with minimum complexity. Thus, the information included in the common DCI may be transmitted over a limited specific search space (e.g., common search space) within the PDCCCH or PDCCH. The common DCI having the features described above may be referred to as a 'first common DCI'). The first common DCI may be transmitted over a group common PDCCH of the NR. In this case, at least one of a transmission cycle and a position of a transmission slot of each of the first common DCIs may be configured independently.

Meanwhile, a common DCI (hereinafter referred to as a 'second common DCI') other than the first common DCI may include information for a random access response, scheduling information of a PDSCH including system information, power control information, and the like. The second common DCI may be transmitted through a PDCCH. The search space (e.g., common search space, UE-specific search space) for the second common DCI may be configured to be wider than the search space for the first common DCI.

Search Space

The search space of LTE may be classified into the common search space and the UE-specific search space, and the type of the radio network temporary identifier (RNTI) monitored by the terminal may be defined differently according to the search space. For example, a DCI including a cyclic redundancy check (CRC) scrambled with a system information RNTI (SI-RNTI), a random access (RA) RNTI (RA-RNTI), a paging-RNTI (P-RNTI), a transmit power control (TPC) PUCCH RNTI (TPC-PUCCH-RNTI), a TPC-PUSCH-RNTI, an enhanced interference management and traffic adaptation (eIMTA) RNTI (eIMTA-RNTI), or the like may be transmitted over the common search space. Since a beamforming is not applied to the control channel (e.g., control signal) in LTE, the common DCI or the UE-specific DCI may be broadcast to multiple terminals via the common search space. Therefore, in LTE, all terminals may acquire the common DCI or the UE-specific DCI by monitoring the same search space (e.g., common search space).

On the other hand, in the NR, since a control channel (e.g., control signal) may be beamformed, and terminals in the same cell may operate in different frequency bands, it may be inappropriate for the terminals to monitor the same search space to receive a specific common DCI (e.g., the second common DCI). Therefore, the search space in the NR may be defined as one integrated search space without being classified into the common search space and the UE-specific search space (hereinafter referred to as 'Method 400-1').

According to Method 400-1, one integrated search space for the terminals may be configured in the control resource set. In this case, a plurality of control resource sets for the terminal are configured, which means that the same number of search spaces as the number of the plurality of control resource sets are configured.

When the DCI is transmitted through the search space (e.g., integrated search space) configured for the terminal, the base station may scramble the CRC using all types of RNTIs allowed for PDCCH transmission, and the terminal may monitor all type of RNTIs allowed for the PDCCH transmission in the search space (e.g., integrated search space). Alternatively, the base station may scramble the CRC using an RNTI allowed for the common DCI when transmitting the common DCI through the search space in the base control resource set, and scramble the CRC using all types of RNTIs when transmitting the DCI (e.g., common DCI or UE-specific DCI) through the search space in the additional control resource set. In this case, the terminal may monitor the RNTI allowed for the common DCI in the search space in the base control resource set (e.g., common DCI monitoring), and may monitor all types of RNTIs in the search space in the additional control resource set (e.g., common DCI and UE-specific DCI monitoring).

When there are many types of RNTIs to be monitored in one search space (e.g., integrated search space), the terminal should perform CRC checks several times for a plurality of RNTIs in the blind decoding operation of the PDCCH. In this case, the reception complexity of the terminal may increase, but the increase of the reception complexity may be lower than the complexity required for decoding the channel. Method 400-1 may be applied to all control resource sets (e.g., base control resource set and additional control resource sets).

Alternatively, Method 400-1 may be applied only to the additional control resource sets. When Method 400-1 is applied only to the additional control resource sets, the common search space and the UE-specific search space may be configured in the base control resource set. Within the base control resource set, the common search space may exist by default and the UE-specific search space may be additionally configured. When Method 400-1 is not applied, at least one of the common search space and the UE-specific search space may be configured in the additional control resource set.

The search space may be predefined for each CCE aggregation level. For example, the search space where the terminal performs monitoring (e.g., the number of PDCCH candidates, the resource location, etc.) may be predefined at each of the CCE aggregation levels 1, 2, 4 and 8. Alternatively, the search space may be configured by the base station by the CCE aggregation level, and the base station may inform the terminal of the configured search space. In order to reduce the complexity of the PDCCH decoding operation of the terminal in the NR, the base station may inform the terminal of the number of PDCCH candidates for each CCE aggregation level or the total number of PDCCH candidates through a signaling procedure. The terminal may perform the PDCCH blind decoding operation based on the information obtained through the signaling procedure.

Here, the search space may indicate a sum of search spaces for the respective CCE aggregation levels. Also, the search space may indicate each search space according to each CCE aggregation level. For example, when the common search space includes search spaces corresponding to the CCE aggregation levels 4 and 8, the corresponding search spaces may be referred to as one search space. Also, the presence of the plurality of search spaces may indicate that there are a plurality of search spaces corresponding to a plurality of CCE aggregation levels.

Meanwhile, the search space in the control resource set may be defined as follows. The basic unit for the configuration of the control resource set may be an REG, and there may be CCEs each of which is composed of a plurality of REGs in the control resource set. The CCEs within a single control resource set may not be overlapped with each other. The search space in the control resource set may include REGs. A candidate set of REGs for defining a specific search space may be referred to as an 'REG Pool'. A REG pool for the common search space may be referred to as a 'common REG pool', and a REG pool for the UE-specific search space may be referred to as a 'UE-specific REG pool'. The search space may be configured within the REG pool according to a predefined rule. For example, the search space may consist of all the REGs belonging to the REG pool, or may be composed of some REGs belonging to the REG pool. For example, in order to configure the search space with some REGs in the REG pool, a hash function used for configuring the search space of the PDCCH or EPDCCH of the LTE may be used identically or similarly.

The REG pool may occupy the entire frequency region of the control resource set and may include at least one OFDM symbol among the OFDM symbols constituting the control resource set (hereinafter referred to as a 'Method 500-1'). A plurality of REG pools may be configured in one control resource set, whereby one control resource set may include a plurality of different types of search spaces (e.g., common search space and UE-specific search space). Alternatively, one control resource set may include a plurality of search spaces of the same type (e.g., a plurality of UE-specific search spaces).

Figure 4A:
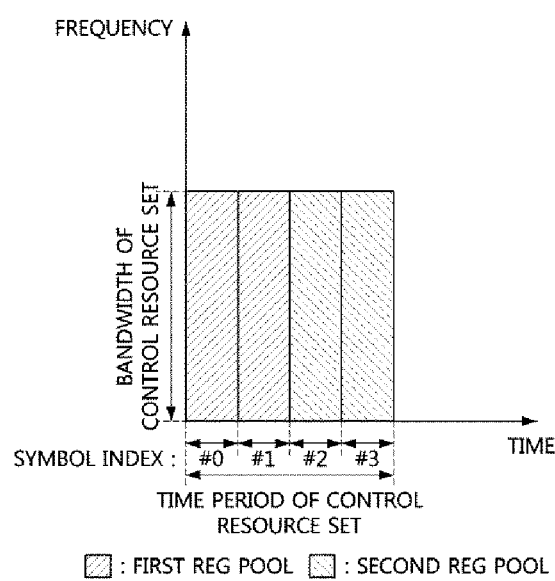
FIG. 4A is a conceptual diagram illustrating a first embodiment of a REG pool in a control resource set.
Figure 4B:
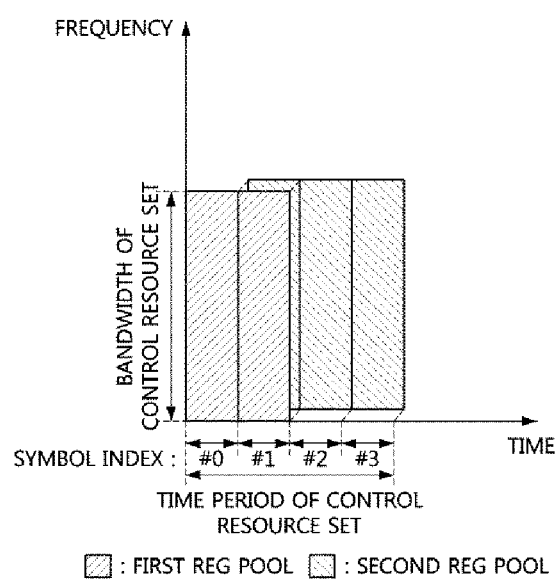
FIG. 4B is a conceptual diagram illustrating a second embodiment of a REG pool in a control resource set.
Figure 4C:
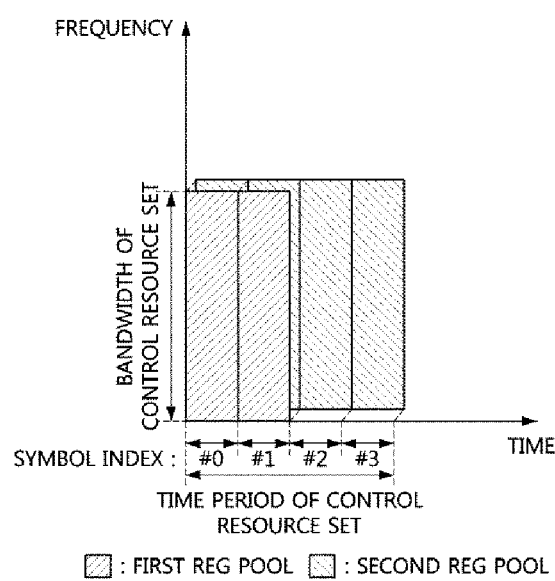
FIG. 4C is a conceptual diagram illustrating a third embodiment of a REG pool in a control resource set.

FIG. 4A is a conceptual diagram illustrating a first embodiment of a REG pool in a control resource set, FIG. 4B is a conceptual diagram illustrating a second embodiment of a REG pool in a control resource set, FIG. 4C is a conceptual diagram illustrating a third embodiment of a REG pool in a control resource set, FIG. 4D is a conceptual diagram illustrating a fourth embodiment of a REG pool in a control resource set, and FIG. 4E is a conceptual diagram illustrating a fifth embodiment of a REG pool in a control resource set.

Referring to FIGS. 4A to 4E, a plurality of search spaces may exist in one control resource set. The control resource set may be configured in a continuous frequency region (e.g., continuous PRBs) or a discontinuous frequency region (e.g., discontinuous PRBs). According to Method 500-1, each of a first REG pool and a second REG pool may occupy the entire frequency region of the control resource set. That is, the frequency regions of the first REG pool and the second REG pool may be the same as the frequency region of the control resource set.

In FIGS. 4A to 4C, time periods of the control resource set may be periodically repeated. For example, each time period of the control resource set may consist of 4 consecutive OFDM symbols. The first REG pool may be a common REG pool, and a common search space may be defined within the first REG pool. The second REG pool may be a UE-specific REG pool, and a UE-specific search space may be defined within the second REG pool. For fast reception of the common DCI, the common REG pool may be composed of first N OFDM symbols in the control resource set (hereinafter referred to as a 'Method 500-2'. N may be an integer of 1 or more.

The search space configured in the REG pool (e.g., common REG pool) to which Method 500-2 is applied may be protected so that the search space can be monitored by the terminal. The terminal may always monitor the search space corresponding to the first REG pool.

In FIG. 4A, the REG pools (e.g., the first REG pool and the second REG pool) may be configured so as to not overlap with each other (hereinafter referred to as a 'Method 510-1'). According to Method 510-1, since there is no resource collision between PDCCH candidates in different search spaces, a mapping rule between CCEs and REGs may be simplified.

In FIGS. 4B and 4C, the REG pools (e.g., the first REG pool and the second REG pool) may overlap with each other. In FIG. 4B, a part of the first REG pool may overlap with the second REG pool (hereinafter referred to as a 'Method 510-2'). In FIG. 4C, the first REG pool may be included in the second REG pool (hereinafter referred to as a 'Method 510-3'). When Method 510-2 or 510-3 is used, resource efficiency can be improved compared to Method 510-1. Also, since the REG pool of the search space can be extended according to Method 510-2 and Method 510-3, a collision probability between the search spaces of the terminals may be reduced when different search spaces are defined for the respective terminals.

In FIGS. 4D and 4E, the control resource set may include the entire time resource (i.e., all slots and all OFDM symbols) in the time domain. For example, the control resource set may include OFDM symbols #0 to #13 of all slots. The time periods of each REG pool constituting the control resource set may have periodicity, and each REG pool may include one or a plurality of consecutive OFDM symbols within one period. In FIG. 4D, the REG pools may have a cycle in units of the slot. The cycle of the first REG pool may be one slot and the time period of the first REG pool may include first and second OFDM symbols (i.e., OFDM symbols #0 and #1) in each period. The cycle of the second REG pool may be 2 slots and the time period of the second REG pool may include third and fourth OFDM symbols (i.e., OFDM symbols #2 and #3 of the first slot) in each period. For example, the first REG pool may be a common REG pool, and a common search space may be defined within the first REG pool. For example, the second REG pool may be a UE-specific REG pool, and a UE-specific search space may be defined within the second REG pool.

In FIG. 4E, some REG pools may have a cycle in units of the slot, and some REG pools may have a cycle of OFDM symbol units. The cycle of the first REG pool may be one slot and the time period of the first REG pool may include the first OFDM symbol (i.e., OFDM symbol #0) in each period. The cycle of the second REG pool may be 2 OFDM symbols and the time period of the second REG pool may include the first OFDM symbol (e.g., OFDM symbol #0, #2, #4, #6, #8, #10, or #12) in each period. According to the configuration scheme described above, the first REG pool may be included in the second REG pool. For example, a slot-based scheduling (e.g., scheduling for eMBB transmission) may be performed through the search space defined within the first REG pool. For example, a minislot-based scheduling (e.g., scheduling for URLLC transmission) may be performed through the search space defined within the second REG pool.

The configuration information of the REG pool may be transmitted from the base station to the terminal through a signaling procedure (e.g., RRC signaling procedure). The configuration information of the REG pool may include at least one of time resource information and frequency resource information of the REG pool. The time resource information of the REG pool may include position information of the OFDM symbol(s) constituting the REG pool (e.g., at least one of the length of the time period of the REG pool, the starting point of the time period, and the cycle). Since the PDCCH search space may be defined in the REG pool, the time resource information of the REG pool may mean information on a period during which the terminal monitors the PDCCH search space.

The frequency resource information of the REG pool may not be separately configured to the terminal according to Method 500-1, and the frequency resource of the REG pool may be the same as a frequency resource region of the control resource set including the corresponding REG pool (or, a control resource set having a logical relationship with the corresponding REG pool). For this, when the base station configures the REG pool, the base station may inform the terminal of the control resource set in which the REG pool is included (or, the control resource set having a logical relationship with the corresponding REG pool). For example, the configuration information of the REG pool may include an identifier (ID) of the control resource set, and the control resource set having the ID may be preconfigured in the terminal or configured together with the REG pool.

CCE-REG Mapping Structure

The CCE-REG mapping structure may be defined based on the control resource set or the REG pool belonging to the control resource set. When a plurality of control resource sets or their corresponding search spaces are overlapped on a time-frequency resource, the relationship between search spaces may be considered in the CCE-REG mapping structure. A distributed mapping scheme may be used for the CCE-REG mapping. The distributed mapping scheme may include a case where the REGs constituting each CCE are located discontinuously in at least one of the time period and the frequency band. When the distributed mapping scheme is performed, one-dimensional interleaving in units of the OFDM symbol may be performed.

Figure 5:
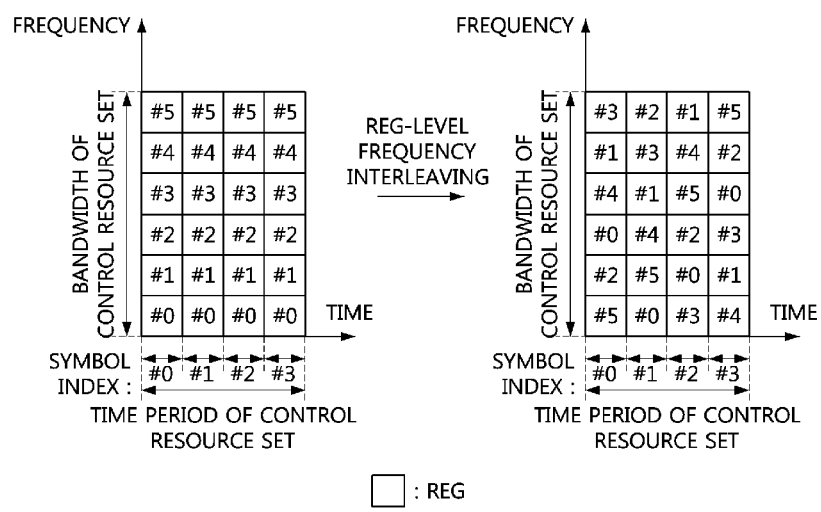
FIG. 5 is a conceptual diagram illustrating a first embodiment of a CCE-REG mapping scheme.

FIG. 5 is a conceptual diagram illustrating a first embodiment of a CCE-REG mapping scheme.

Referring to FIG. 5, a time period of the control resource set may include 4 OFDM symbols, and 6 REGs may be located in each of 4 OFDM symbols. The REG index in each of the 4 OFDM symbols may be set sequentially. For example, the REG index may increase as the frequency band in which the REG is located increases. An REG-level frequency interleaving operation may be applied in each of the 4 OFDM symbols belonging to the control resource set (hereinafter referred to as a 'Method 600-1'). When the REG-level frequency interleaving operation is completed, the REGs in each of the 4 OFDM symbols may be distributed in the frequency band based on a preconfigured interleaving pattern. Here, the interleaving pattern may be set differently for each OFDM symbol. When the interleaving pattern is a pseudo-random interleaving pattern, the pseudo-random interleaving pattern may be set independently for each OFDM symbol. When the interleaving pattern has a predetermined rule, the interleaving patterns between the OFDM symbols may have mutual dependency. As an example, in the same row (e.g., same PRB), the same REG index may not be duplicated. As another example, the same interleaving pattern may be applied to each OFDM symbol.

An REG pool including at least one interleaved REG may be configured in the control resource set. After the REG pool is configured in the control resource set, the REG index set for each OFDM symbol may be translated into a global REG index having a unique value in the REG pool (hereinafter referred to as a 'Method 600-2').

Figure 6:
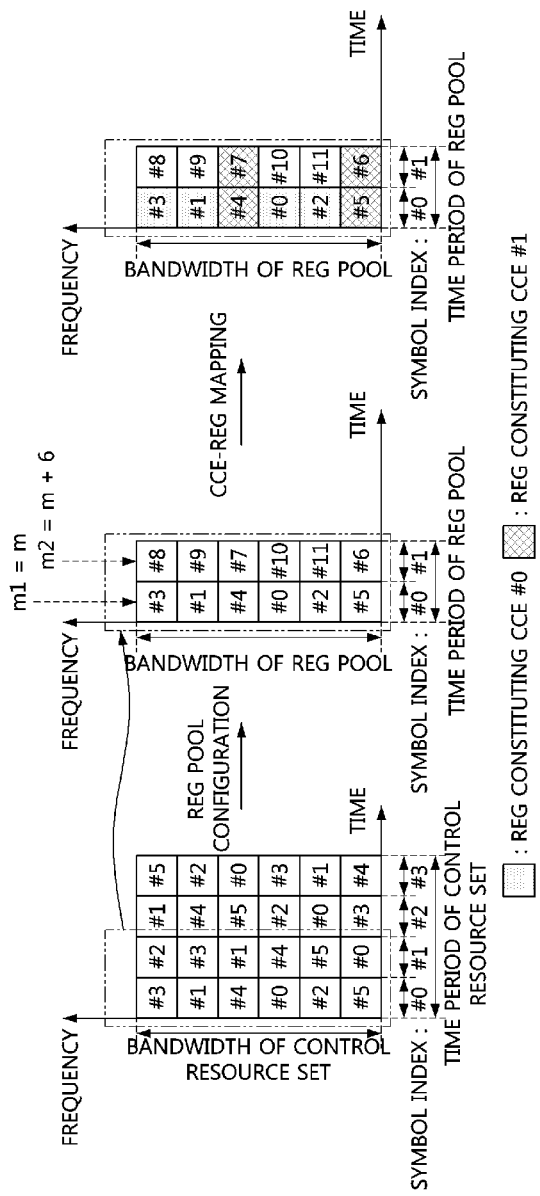
FIG. 6 is a conceptual diagram illustrating a first embodiment of a search space configured in an REG pool.

FIG. 6 is a conceptual diagram illustrating a first embodiment of a search space configured in an REG pool.

Referring to FIG. 6, a search space may be configured based on Method 600-1 and Method 600-2. The REG index in the control resource set of FIG. 6 may be the same as the REG index (e.g., the REG index after the REG-level frequency interleaving is performed) in the control resource set of FIG. 5. The REG pool may include 2 OFDM symbols (e.g., OFDM symbols #0 and #1) of the control resource set, and the REG index of the REG pool may be converted to a global REG index.

For example, the global REG index may be configured first in the frequency band of the first OFDM symbol of the REG pool, and may be configured in the frequency band of the second OFDM symbol of the REG pool after indexing of the first OFDM symbol of the REG pool is completed. In this case, the global REG index may be indexed based on the order of REG indexes in the control resource set. In the first OFDM symbol of the REG pool, the global REG index m1 may be configured to be equal to the REG index in the control resource set. When the REG index is configured as (m=0, 1, 2, 3, 4, 5) in the first OFDM symbol in the REG pool, the global REG index m1 in the first OFDM symbol of the REG pool may be configured to be equal to m. In the second OFDM symbol of the REG pool, the global REG index m2 may be configured as follows. When the REG index is configured as (m=0, 1, 2, 3, 4, 5) in the second OFDM symbol of the REG pool and the number of REGs per OFDM symbol is Q (e.g., 6), the global REG index m2 in the OFDM symbol may be configured based on (m+Q) (e.g., m+6) (hereinafter, referred to as a 'Method 600-3').

In the first embodiment of FIG. 6, 2 CCEs (e.g., CCE #0 and CCE #1) may be configured in the REG pool, and each CCE may include at least one REG (e.g., 4 REGs). The REGs belonging to one CCE may have continuous global REG indexes. For example, the REGs corresponding to the global REGs #0 to #3 may be mapped to the CCE #0, and the REGs corresponding to the global REGs #4 to #7 may be mapped to the CCE #1. In this case, the CCE #0 may be distributed in the frequency band within the first OFDM symbol, and the CCE #1 may be configured in two OFDM symbols. The DCI that the terminal should receive quickly may be transmitted through the CCE #0. The DCI that has relatively more spare time for processing may be transmitted through the CCE #1 or an aggregated CCE including the CCE #0 and the CCE #1. The common search space, the UE-specific search space, and the integrated search space may be configured based on the method described with reference to FIG. 6. For example, each of the common search space, the UE-specific search space, and the integrated search space may include at least one CCE.

Figure 7:
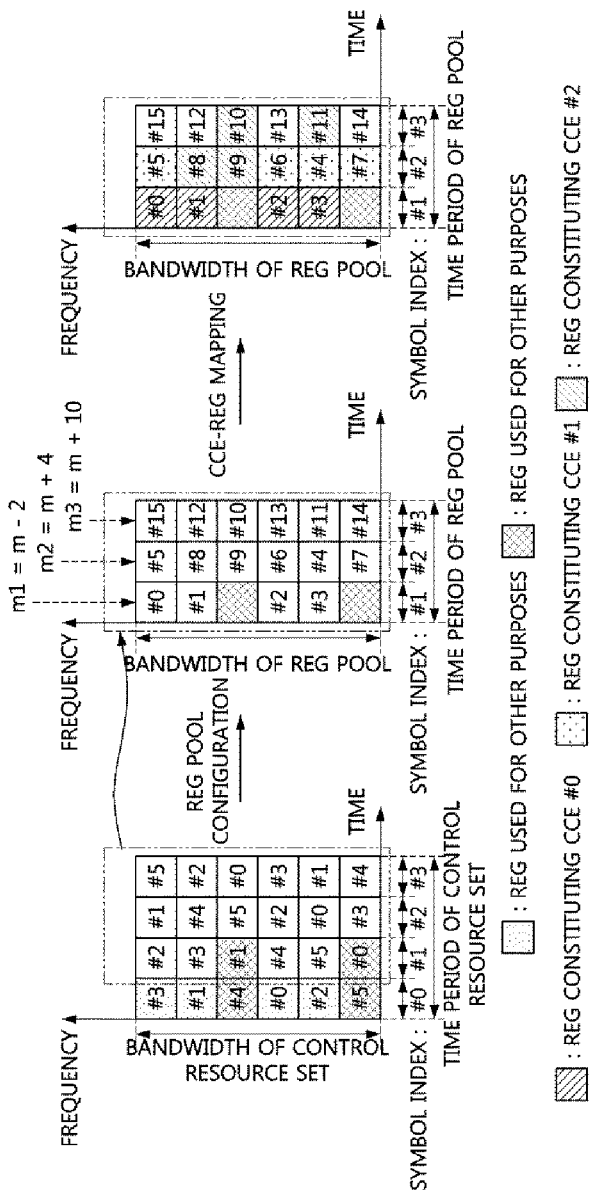
FIG. 7 is a conceptual diagram illustrating a second embodiment of a search space configured in an REG pool.

FIG. 7 is a conceptual diagram illustrating a second embodiment of a search space configured in an REG pool.

Referring to FIG. 7, a search space may be configured based on Method 600-1 and Method 600-2. The REG index in the control resource set of FIG. 7 may be the same as the REG index (e.g., the REG index after the REG-level frequency interleaving is performed) in the control resource set of FIG. 5. The first OFDM symbol (e.g., REGs #0 to #5) of the control resource set and the REGs #0 and #1 in the second OFDM symbol of the control resource set may be used for other purposes (e.g., the search space illustrated in FIG. 6, and REG used for other physical channels and signals). The REG pool may include 3 OFDM symbols (e.g., OFDM symbols #1 to #3) of the control resource set, and the REG index of the REG pool may be converted to a global REG index.

For example, after the indexing operation for the first OFDM symbol of the REG pool is completed, the indexing operation may be performed in the frequency band of the second OFDM symbol of the REG pool, and after the indexing operation for the second OFDM symbol of the REG pool is completed, the indexing operation may be performed in the frequency band of the third OFDM symbol of the REG pool. Since the REGs #0 and #1 in the first OFDM symbol of the REG pool are used for other purpose, the REGs #0 and #1 in the first OFDM symbol of the REG pool may be excluded from the search space (e.g., CCE).

When the number of REGs excluded from the search space up to the OFDM symbol #n (e.g., OFDM symbol #1) of the REG pool is $L_n$ (e.g., 2), the number of REGs belonging to each OFDM symbol is Q (e.g., 6), and the REG index in the first OFDM symbol in the REG pool is configured as (m=2, 3, 4, 5), the global REG index m1 in the first OFDM symbol of the REG pool may be configured based on (m+Q(n−1)−$L_n$ (i.e., m−2)) (hereinafter referred to as a 'Method 600-4'). When the number of REGs excluded from the search space up to the OFDM symbol #n (e.g., OFDM symbol #2) of the REG pool is $L_n$ (e.g., 2), the number of REGs belonging to each OFDM symbol is Q (e.g., 6), and the REG index in the first OFDM symbol in the REG pool is configured as (m=0, 1, 2, 3, 4, 5), the global REG index m2 in the second OFDM symbol of the REG pool may be configured based on (m+Q(n−1)−$L_n$ (i.e., m+4)). When the number of REGs excluded from the search space up to the OFDM symbol #n (e.g., OFDM symbol #3) of the REG pool is Ln (e.g., 2), the number of REGs belonging to each OFDM symbol is Q (e.g., 6), and the REG index in the third OFDM symbol in the REG pool is configured as (m=0, 1, 2, 3, 4, 5), the global REG index m3 in the third OFDM symbol of the REG pool may be configured based on (m+Q(n−1)−$L_n$ (i.e., m+10)).

In the second embodiment of FIG. 7, 3 CCEs (e.g., CCE #0, CCE #1, and CCE #2) may be configured in the REG pool, and each CCE may include 4 REGs. The REGs belonging to one CCE may have continuous global REG indexes. For example, the REGs corresponding to the global REGs #0 to #3 may be mapped to the CCE #0, the REGs corresponding to the global REGs #4 to #7 may be mapped to the CCE #1, and the REGs corresponding to the global REGs #8 to #11 may be mapped to the CCE #2.

As an example, in the REG pool, the CCE may be used as a UE-specific search space, and REGs (e.g., REGs #0 and #1) not configured as the CCE in the first OFDM symbol of the REG pool may be used as a common search space. As another example, in the REG pool, the CCE may be used as a common search space, and REGs (e.g., REGs #0 and #1) not configured as the CCE in the first OFDM symbol of the REG pool may be used for PDCCCH.

When there is an REG that is not included in the search space in a specific OFDM symbol in the REG pool, the REG pool may be composed of the remaining REGs other than the corresponding REG. When the interleaving operation is performed according to Method 600-1, an interleaving pattern may be defined for the REGs other than the corresponding REG. For example, the interleaving pattern for the first OFDM symbol of the REG pool of FIG. 7 may be defined for the remaining 4 REGs except the REGs #0 and #1. In this case, the length or size of the interleaver in the first OFDM symbol of the REG pool may be configured as 4. Alternatively, the REGs #0 and #1 in the first OFDM symbol of the REG pool may be configured as dummy REGs, and an interleaving pattern (e.g., interleaver of length 6) may be defined for the 2 dummy REGs and the remaining 4 REGs.

When a common search space and a UE-specific search space coexist in one control resource set, the common search space is the search space (e.g., CCEs #0 and #1) shown in FIG. 6, and the UE-specific search space is the search space (e.g., CCEs #0 to #2) shown in FIG. 7, since the second OFDM symbol of the control resource set is shared by the two search spaces, PDCCH candidates of the two search spaces may collide with each other. However, since the CCE #0 of the UE-specific search space is mapped to REGs other than REGs occupied by the CCE #1 of the common search space according to Method 600-4, a collision between the two search spaces (e.g., 2 CCEs) may not occur. Therefore, by reducing the collision probability between the PDCCH candidates, an effect of increasing an effective transmission capacity of the downlink control region and improving the PDCCH reception performance can be obtained.

Figure 8:
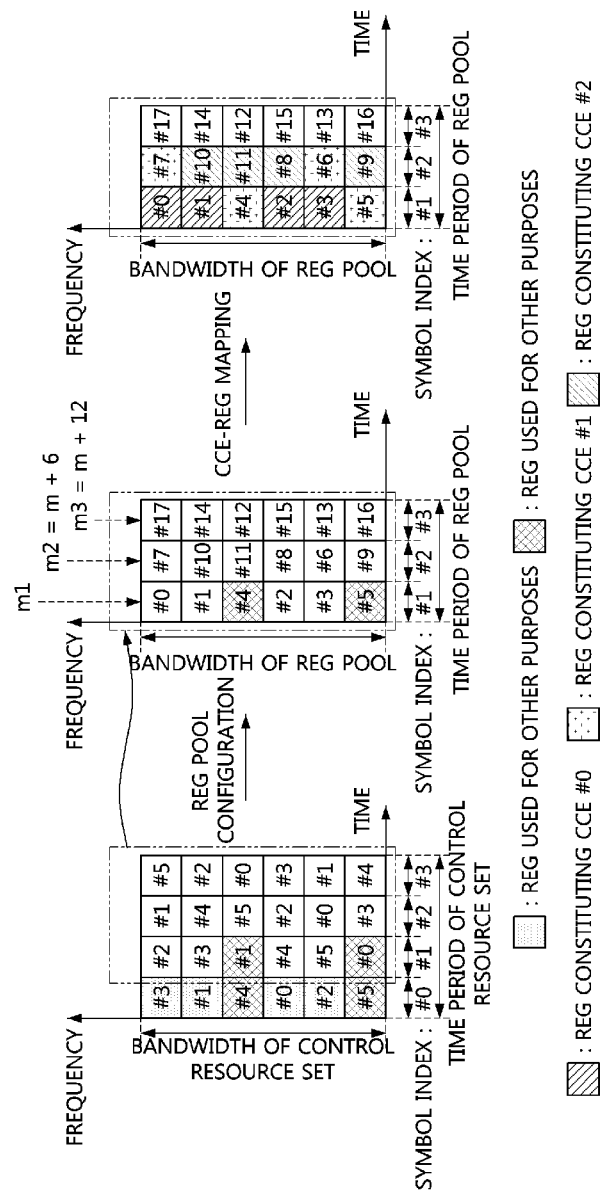
FIG. 8 is a conceptual diagram illustrating a third embodiment of a search space configured in an REG pool.

FIG. 8 is a conceptual diagram illustrating a third embodiment of a search space configured in an REG pool.

Referring to FIG. 8, a search space may be configured based on Method 600-1 and Method 600-2. The REG index in the control resource set of FIG. 8 may be the same as the REG index (e.g., the REG index after the REG-level frequency interleaving is performed) in the control resource set of FIG. 5. The first OFDM symbol (e.g., REGs #0 to #5) of the control resource set and the REGs #0 and #1 in the second OFDM symbol of the control resource set may be used for other purposes (e.g., the search space illustrated in FIG. 6, and REG used for other physical channels and signals). The REG pool may include 3 OFDM symbols (e.g., OFDM symbols #1 to #2) of the control resource set, and the REG index of the REG pool may be converted to a global REG index.

For example, after the indexing operation for the first OFDM symbol of the REG pool is completed, the indexing operation may be performed in the frequency band of the second OFDM symbol of the REG pool, and after the indexing operation for the second OFDM symbol of the REG pool is completed, the indexing operation may be performed in the frequency band of the third OFDM symbol of the REG pool. Although the REGs #0 and #1 in the first OFDM symbol of the REG pool are used for other purpose, a search space (e.g., CCE) including all the REGs (e.g., REG #0 to #5) in the first OFDM symbol of the REG pool may be configured.

Global REG indexes for the REGs #2 to #5 not used for other purposes in the first OFDM symbol of the REG pool may be configured first, and then global REG indexes for the REGs #0 and #1 used for other purposes in the first OFDM symbol may be configured (hereinafter referred to as a 'Method 600-5'). When the number of REGs belonging to each OFDM symbol is Q (e.g., 6), and the REG index in the second OFDM symbol of the REG pool is configured as (m=0, 1, 2, 3, 4, 5), the global REG index m2 in the second OFDM symbol of the REG pool may be configured based on (m+Q(n−1)) (e.g., m+6). Here, n may indicate an index of an OFDM symbol belonging to the REG pool. When the number of REGs belonging to each OFDM symbol is Q (e.g., 6), and the REG index in the third OFDM symbol of the REG pool is configured as (m=0, 1, 2, 3, 4, 5), the global REG index m3 in the third OFDM symbol of the REG pool may be configured based on (m+Q(n−1)) (e.g., m+12).

Meanwhile, the CCE #0 shown in FIG. 6 described above may be used for transmission of a specific common DCI (e.g., slot configuration information). In this case, the terminal may receive the common DCI in the first OFDM symbol of the control resource set without performing the blind decoding operation. When a plurality of common DCIs are transmitted in one slot, the number of PDCCH candidates used for the common DCI transmission may increase in proportion to the number of common DCIs.

The embodiments shown in FIGS. 6 to 8 may be the CCE-REG mapping structure based on the distributed mapping scheme, and a CCE-REG mapping structure based on a localized mapping scheme will be described below. When the local mapping scheme is applied, the REGs constituting the CCE may be configured to be continuous (e.g., as contiguous as possible) in at least one of the time period and the frequency band. The CCE configured on the basis of the localized mapping scheme may be suitable for a case where the base station transmits DCIs by applying a different beamforming to each terminal.

In a frequency band, one control resource set may be composed of M CCEs, and in the frequency band, one CCE may be composed of K PRBs. Here, each of M and K may be an integer. Each of the CCEs constituting one control resource set and the PRBs constituting one CCE may be continuous or discontinuous in the frequency band. For example, in order to obtain a frequency diversity gain, each of the CCEs and PRBs may be continuous or discontinuous in the frequency band, and each of the CCEs and PRBs may be continuous in the frequency band in order to minimize overhead of the configuration information of the control resource set (hereinafter referred to as a 'Method 700-1').

Meanwhile, the control resource set or the REG pool may be composed of N OFDM symbols in a time period, and one CCE may be composed of one OFDM symbol in a time period. Here, N may be an integer. Therefore, one control resource set or one REG pool may be composed of (M×N) CCEs, and the (M×N) CCEs may correspond to (M×N×K) PRBs (hereinafter referred to as a 'Method 700-2'). Each of M, N and K may be set differently for each control resource set (e.g., base control resource set and additional control resource set) or REG pool. When a plurality of bandwidth parts are configured in the terminal, each of M, N and K may be set differently for each bandwidth part. The candidate values of M, N, and K may be defined differently for each of the numerologies shown in Table 1.

The size of each of the time period and the frequency band of the control resource set may be configured by the base station, and the base station may transmit the configuration information of the control resource set (e.g., the size of the time period, the size of the frequency band) to the terminal through a signaling procedure. Here, the signaling procedure may include a physical layer dynamic signaling procedure (e.g., a DCI transmission procedure), a semi-static signaling procedure (e.g., an RRC signaling procedure or a broadcasting procedure of system information), or the like. For example, when Method 700-2 is used, the base station may inform the terminal of M and N through the signaling procedure, and a predetermined value of K may be used.

A search space within the control resource set or the REG pool belonging to the control resource set (hereinafter collectively referred to as a 'control resource set') may be configured as an entire control resource set (hereinafter referred to as a 'Method 710'). Alternatively, in the control resource set, the search space may be configured as a partial region of the control resource set (hereinafter referred to as a 'Method 720'). The search space may refer to a sum of the search spaces for the respective CCE aggregation levels. Depending on the configuration of the search space per CCE aggregation level, Method 710 may be classified into Methods 710-1 to 710-3. In Method 710-1, the sum of the search spaces for the respective CCE aggregation levels may be the entire control resource set, and in Method 710-2, the search spaces of at least one CCE aggregation level may be a superset including the search spaces of the remaining CCE aggregation levels. In Method 710-3, the search spaces for the respective CCE aggregation levels may be a part of the control resource set, and the sum of the search spaces of all CCE aggregation levels may be the entire control resource set.

Figure 9A:
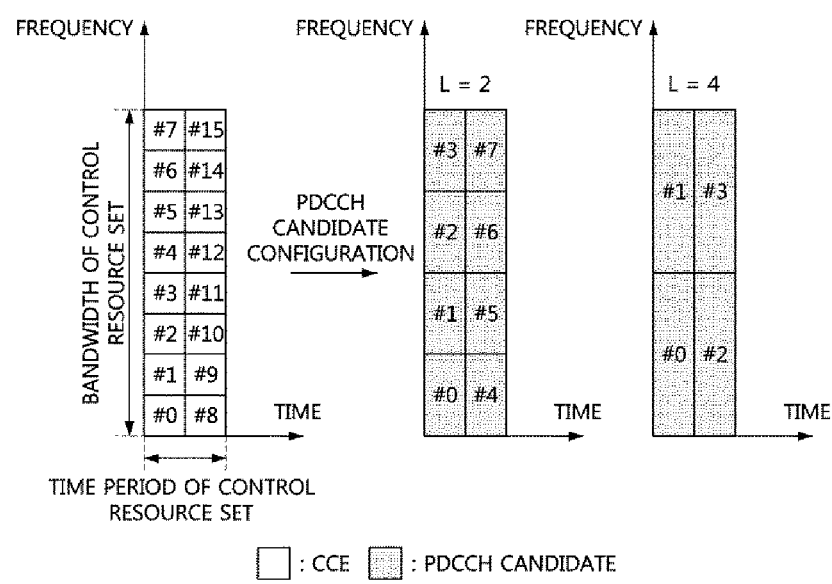
FIG. 9A is a conceptual diagram illustrating a first embodiment of a search space in a control resource set.
Figure 9B:
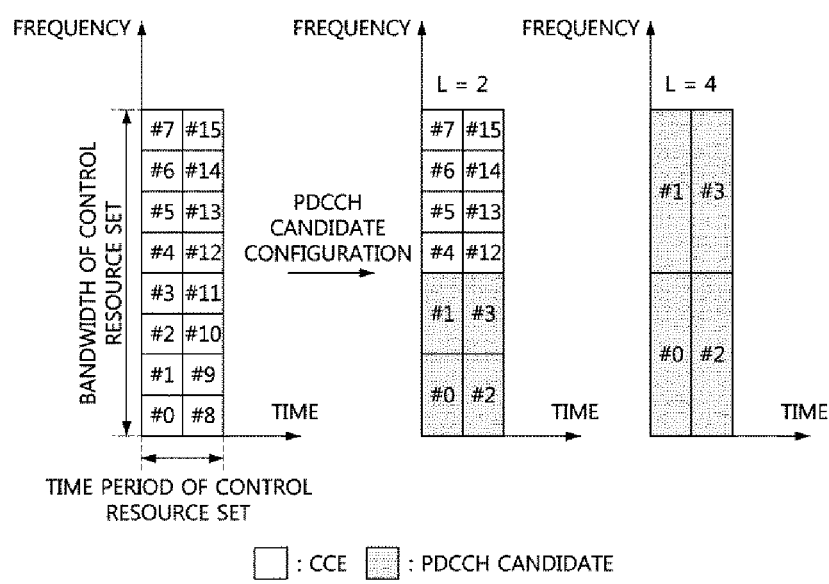
FIG. 9B is a conceptual diagram illustrating a second embodiment of a search space in a control resource set.
Figure 9C:
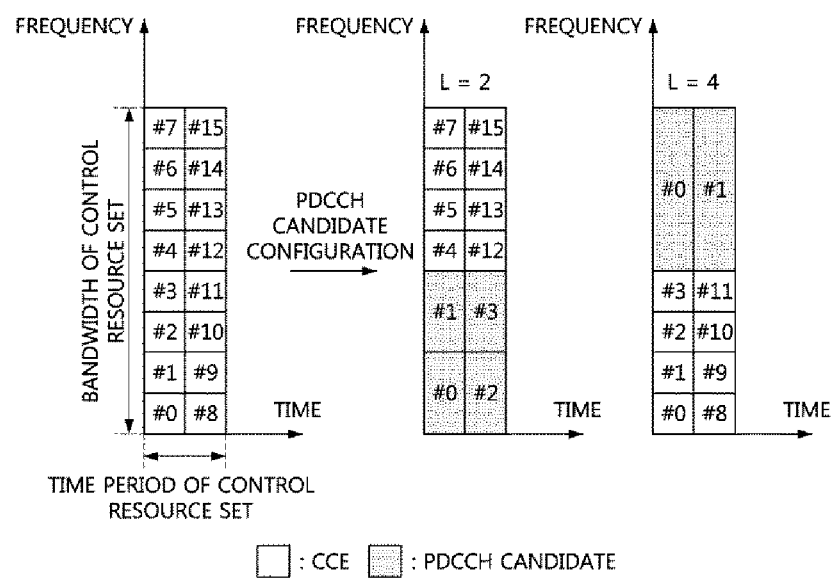
FIG. 9C is a conceptual diagram illustrating a third embodiment of a search space in a control resource set.

FIG. 9A is a conceptual diagram illustrating a first embodiment of a search space in a control resource set, FIG. 9B is a conceptual diagram illustrating a second embodiment of a search space in a control resource set, FIG. 9C is a conceptual diagram illustrating a third embodiment of a search space in a control resource set.

Referring to FIGS. 9A to 9C, a control resource set may be composed of 2 CCEs in a time period, and may be composed of 8 CCEs in a frequency band. The CCE indexes may be configured in the frequency band first, and thereafter in the time period. The search space shown in FIG. 9A may be configured based on Method 710-1. In FIG. 9A, a search space of the CCE aggregation level (i.e., L) 2 may be composed of 8 PDCCH candidates (e.g., PDCCH candidates #0 to #7), and a sum of the 8 PDCCH candidates may be an entire control resource set (e.g., entire REG pool). In FIG. 9A, a search space of the CCE aggregation level 4 may be composed of 4 PDCCH candidates (e.g., PDCCH candidates #0 to #3), and a sum of the 4 PDCCH candidates may be an entire control resource set (e.g., entire REG pool).

The search space shown in FIG. 9B may be configured based on Method 710-2. In FIG. 9B, a search space of the CCE aggregation level 2 may be composed of 4 PDCCH candidates (e.g., PDCCH candidates #0 to #3). In FIG. 9B, a search space of the CCE aggregation level 4 may be composed of 4 PDCCH candidates (e.g., PDCCH candidates #0 to #3), and a sum of the 4 PDCCH candidates may be an entire control resource set (e.g., entire REG pool).

The search space shown in FIG. 9C may be configured based on Method 710-3. In FIG. 9C, a search space of the CCE aggregation level 2 may be composed of 4 PDCCH candidates (e.g., PDCCH candidates #0 to #3), and the 4 PDCCH candidates may a part of the control resource set (e.g., REG pool). In FIG. 9C, a search space of the CCE aggregation level 4 may be composed of 2 PDCCH candidates (e.g., PDCCH candidates #0 to #1), and a sum of the 2 PDCCH candidates may a part of the control resource set (e.g., REG pool). In FIG. 9C, a sum of the 4 PDCCH candidates according to the CCE aggregation level 2 and the 2 PDCCH candidates according to the CCE aggregation level 4 may be an entire control resource set (e.g., entire REG pool).

Meanwhile, when the CCE aggregation level L is set to $2^X$, the constraint of the sizes of the time period and the frequency band of the control resource set may be increased. Here, X may be an integer. The control resource set may be composed of $2^Y$ CCEs in the frequency band, and the control resource set may be composed of $2^Z$ CCEs in the time period (hereinafter referred to as a 'Method 800-1'). Here, each of Y and Z may be an integer. Alternatively, the control resource set may be composed of $2^Y$ CCEs in the frequency band, and the control resource set may be composed of Z CCEs in the time period (hereinafter referred to as a 'Method 800-2'). When the control resource set is configured based on Method 800-1 or Method 800-2, the CCE-REG mapping rule may be simplified. The control resource set shown in FIGS. 9A to 9C may be configured based on Method 800-1. In this case, Y may be 3, and Z may be 1. Also, the control resource set may be composed of Q PRBs in the frequency band. Here, Q may be an integer.

Figure 10A:
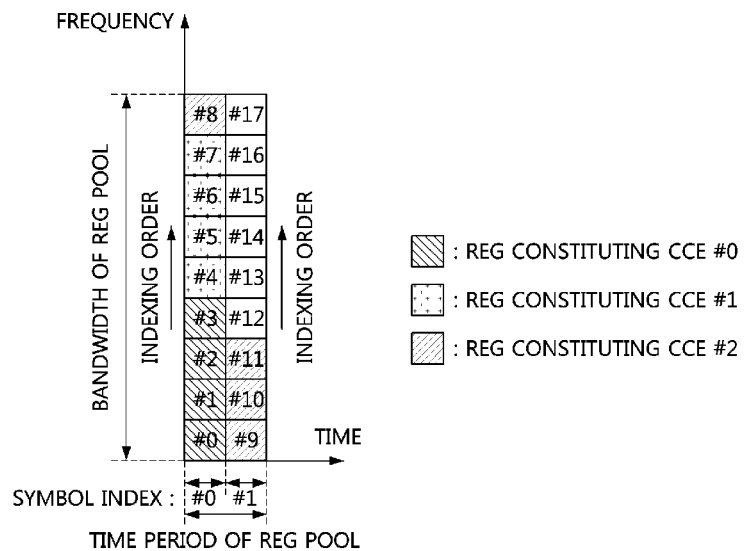
FIG. 10A is a conceptual diagram illustrating a first embodiment of CCEs according to a localized CCE-REG mapping.
Figure 10B:
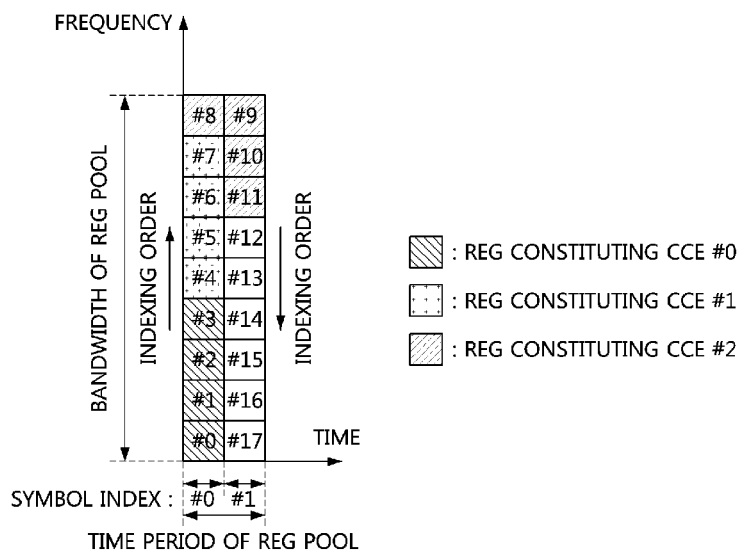
FIG. 10B is a conceptual diagram illustrating a second embodiment of CCEs according to a localized CCE-REG mapping.
Figure 10C:
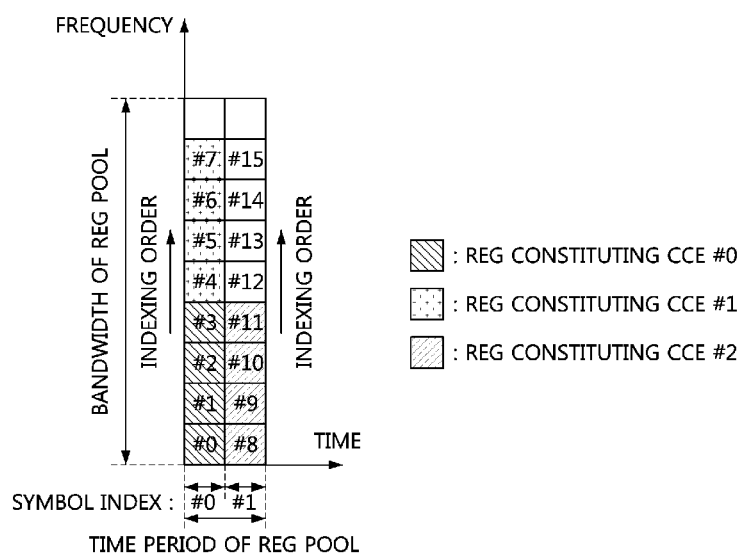
FIG. 10C is a conceptual diagram illustrating a third embodiment of CCEs according to a localized CCE-REG mapping.

FIG. 10A is a conceptual diagram illustrating a first embodiment of CCEs according to a localized CCE-REG mapping, FIG. 10B is a conceptual diagram illustrating a second embodiment of CCEs according to a localized CCE-REG mapping, and FIG. 10C is a conceptual diagram illustrating a third embodiment of CCEs according to a localized CCE-REG mapping.

Referring to FIGS. 10A to 10C, a REG pool may include 2 OFDM symbols, and 9 REGs (e.g., 9 PRBs) may be configured in each of the 2 OFDM symbols. One CCE may include 4 REGs. When the number of REGs per OFDM symbol is Q and the number of REGs per CCE is K, Q may be 9, and K may be 4. The REG indexes may be configured first in the frequency band, and then in the time period. When the 4 REGs are mapped to one CCE in the order of the REG indexes, Q may not be divided by K.

The order of REG indexes (e.g., increasing and decreasing directions) in the respective OFDM symbols in FIG. 10A may be the same. In FIG. 10A, the CCE #0 may include the REGs #0 to #3, the CCE #1 may include the REGs #4 to #7, and the CCE #2 may include the REGs #8 to #11. The order of REG indexes (e.g., increasing and decreasing directions) in the respective OFDM symbols in FIG. 10B may be different. For example, the REG indexes in the OFDM symbol #0 may increase as the frequency increases, and the REG indexes in the OFDM symbol #1 may increase as the frequency decreases. In FIG. 10B, the CCE #0 may include the REGs #0 to #3, the CCE #1 may include the REGs #4 to #7, and the CCE #2 may include the REGs #8 to #11. Due to the difference in the methods of configuring the REG indexes, the CCE #2 in FIG. 10B may be configured in the more localized manner in the frequency band as compared with the CCE #2 in FIG. 10A.

When the DCI is transmitted to the terminal through the CCE #2 in the control resource set, a UE-specific DMRS for the corresponding DCI may be transmitted through 4 PRBs occupied by the CCE #2 in FIG. 10A, and a UE-specific DMRS for the corresponding DCI may be transmitted via 3 PRBs occupied by the CCE #2 in FIG. 10B. Therefore, the embodiment shown in FIG. 10B may reduce the DMRS overhead as compared with the embodiment shown in FIG. 10A, and the channel estimation performance of the terminal can be improved since the 3 PRBs are continuous in the frequency band of FIG. 10B.

In each OFDM symbol in FIG. 10C, one REG that is not divided by 4 among 9 REGs may be excluded from the indexing, and a REG to which the REG index is not set may be excluded from the search space. The order of REG indexes (e.g., increasing and decreasing directions) in the respective OFDM symbols in FIG. 10C may be the same. Alternatively, the order of REG indexes in the respective OFDM symbols in FIG. 10C may be different. In FIG. 10C, each of the CCEs may be configured in one OFDM symbol, and the CCEs may have a lattice structure. In this case, CCEs located in different OFDM symbols may be efficiently aggregated. For example, since the CCE #0 and the CCE #2 are mapped to the same frequency band, in order to receive the PDCCH through the aggregated CCEs #0 and #2, the terminal may perform channel estimation for 4 PRBs (i.e., REGs). On the other hand, when the CCE #0 and the CCE #2 are aggregated in FIG. 10A, the terminal should perform channel estimation on 5 PRBs (i.e., REGs) in order to receive the PDCCH through aggregated CCEs #0 and #2. Also, when a sum of the remaining REGs not divided by K in the OFDM symbols of one REG pool is equal to or larger than K, a CCE may be further configured using the remaining REGs.

The information indicating the size of the control resource set described above may be one of the parameters (hereinafter referred to as 'configuration parameters') needed for configuring the control resource set. Also, the configuration parameters may include a numerology, a DMRS type, a position of a time-frequency resource, a CCE mapping rule, a CCE aggregation level, a transmission mode, the number of DMRS ports, information indicating whether a DMRS is shared between the control channel and the data channel, and the like. When the control resource set is configured by an RRC signaling procedure, the configuration parameters may be uniquely configured in the terminal. When the configuration parameters are transmitted over a channel (e.g., PBCH) which comprises limited bits, several combinations of some or all of the configuration parameters may be predefined, and one of the combinations may be configured in the terminal.

A plurality of control resource sets or a plurality of REG pools may overlap in the same resource region. In order to increase the resource efficiency, the same resource region may be configured as an additional control resource set for a plurality of terminals. In this case, a part or all of the additional control resource sets of different terminals may be overlapped. When the additional control resource set is configured by a UE-specific signaling procedure, since the terminal cannot identify an additional control resource set of another terminal, the terminal may not identify whether the additional control resource sets are overlapped or not.

Meanwhile, when a plurality of control resource sets for one terminal are configured to overlap, an operation of the terminal for the plurality of overlapping control resource sets may be defined. In this case, the terminal may perform the monitoring operation in each of the plurality of control resource sets in the same manner as when the plurality of control resource sets are not overlapped. Alternatively, priorities of the plurality of overlapping control resource sets may be configured, the terminal may monitor an entire search space of a control resource set having a high priority, and may monitor a part (e.g., a region not overlapping among the plurality of control resource sets) of an entire search space of a control resource set having a low priority. When a base control resource set and an additional control resource set for one terminal are configured to overlap with each other, the priority of the basic control resource set may be set higher than that of the additional control resource set.

Coexistence Between PDCCCH and PDCCH

The PDCCCH may be configured in a control resource set or an REG pool included in a control resource set (hereinafter collectively referred to as a 'control resource set'). Since the PDCCCH may be used for the transmission of the common DCI, the PDCCCH may be located in a front region of the control resource set. For example, the PDCCCH may be distributed in the frequency band in the first OFDM symbol of the control resource set. The PDCCCH may be arranged similarly to the PCFICH of LTE. The PDCCCH and the search space may be located in one OFDM symbol. In this case, the search space and the PDCCCH may be configured as follows.

Figure 11A:
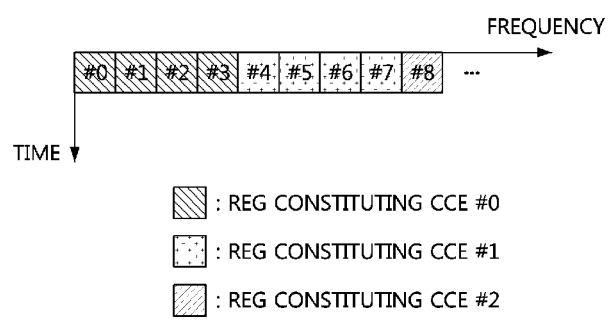
FIG. 11A is a conceptual diagram illustrating a first embodiment of a method of configuring a search space and a PDCCCH.
Figure 11B:
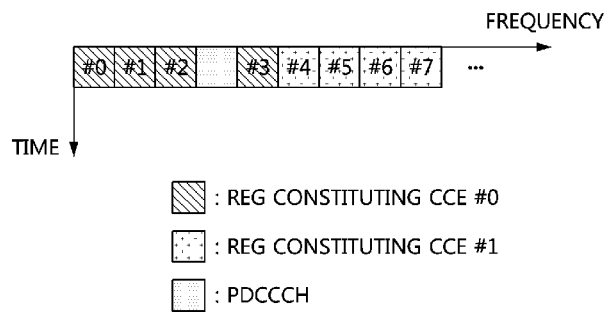
FIG. 11B is a conceptual diagram illustrating a second embodiment of a method of configuring a search space and a PDCCCH.
Figure 11C:
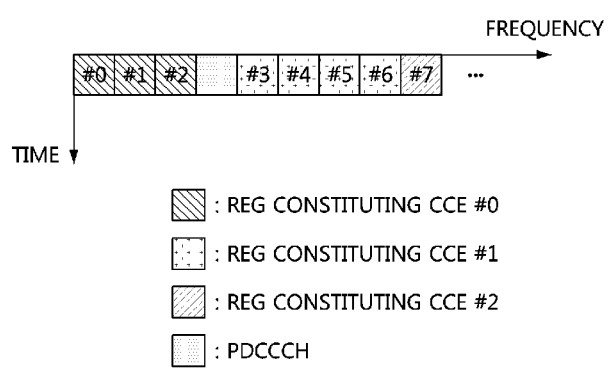
FIG. 11C is a conceptual diagram illustrating a third embodiment of a method of configuring a search space and a PDCCCH.
Figure 11D:
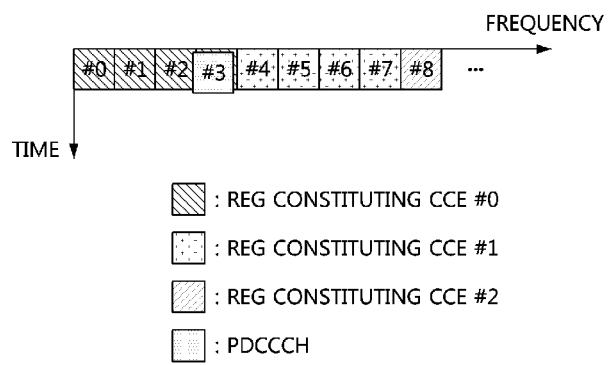
FIG. 11D is a conceptual diagram illustrating a fourth embodiment of a method of configuring a search space and a PDCCCH.

FIG. 11A is a conceptual diagram illustrating a first embodiment of a method of configuring a search space and a PDCCCH, FIG. 11B is a conceptual diagram illustrating a second embodiment of a method of configuring a search space and a PDCCCH, FIG. 11C is a conceptual diagram illustrating a third embodiment of a method of configuring a search space and a PDCCCH, and FIG. 11D is a conceptual diagram illustrating a fourth embodiment of a method of configuring a search space and a PDCCCH.

Referring to FIGS. 11A to 11D, a search space and a PDCCCH may exist in one OFDM symbol. For example, the search space may be configured in the remaining resource region other than the resource region in which the PDCCCH is configured. Here, the CCE-REG mapping structure may be configured based on the localized mapping scheme. In FIG. 11A, the PDCCCH may not exist, the REGs #0 to #3 may be mapped to the CCE #0, and the REGs #4 to #7 may be mapped to the CCE #1.

In FIG. 11B, the PDCCCH may be located in the fourth REG. In this case, indexes may be configured for the REGs other than the fourth REG among all the REGs, and the search space may be composed of the remaining REGs. In order to match the number of REGs included in the CCE to 4, another REG may be mapped to the CCE #0 instead of the fourth REG. For example, the REGs #0 to #3 may be mapped to the CCE #0, and the REGs #4 to #7 may be mapped to the CCE #1. Therefore, even when there is an exceptional REG (e.g., REG in which the PDCCCH is configured), the number of REGs included in the CCE remains the same, so that the PDCCH candidates may have uniform performance.

In FIG. 11C, the PDCCCH may be located in the fourth REG. In this case, indexes may be configured for the REGs other than the fourth REG among all the REGs, and the search space may be composed of the remaining REGs. That is, even when there is an exceptional REG (e.g., REG in which the PDCCCH is configured), the CCE-REG mapping scheme may not be changed. Therefore, the REGs #0 to #2 may be mapped to the CCE #0, and the REGs #3 to #6 may be mapped to the CCE #1.

Meanwhile, the PDCCCH and the search space may be configured to overlap with each other. In this case, a puncturing function may be applied according to the priority between the PDCCCH and the search space. When the importance of information transmitted through the PDCCCH is higher than the importance of information transmitted through the search space, and the PDCCCH and the search space coexist, the search space may be punctured by the PDCCCH. In FIG. 11D, when the PDCCCH is located in the fourth REG, the fourth REG may be indexed as the 'REG #3'. When the transmission of the PDCCCH through the REG #3 and the transmission of the PDCCH through the CCE #0 are performed at the same time, the fourth REG in the CCE #0 may be punctured by the PDCCCH. In FIG. 11D, the terminal may estimate that the same CCE-REG mapping is used regardless of the presence or absence of the PDCCCH. Therefore, the terminal in the RRC_IDLE may determine that the same CCE-REG mapping method is used even when the terminal does not acquire the PDCCCH configuration information, so that the monitoring performance of the PDCCH can be improved.

CCE Aggregation Level

Various CCE aggregation levels may be defined for link adaptive transmission of the PDCCH. For example, a relatively high CCE aggregation level may be required for a terminal located at a cell boundary, and a relatively low CCE aggregation level may be required for a terminal located at a cell center. Also, a relatively low CCE aggregation level may be required for a terminal receiving a UE-specific DCI, and a relatively high CCE aggregation level may be required for a terminal receiving a common DCI.

Therefore, the base station may configure a CCE aggregation level for the PDCCH blind decoding operation for each search space, and inform the terminal of the configured CCE aggregation level through a signaling procedure. The base station may configure a CCE aggregation level for a search space configured through an additional control resource set, and a CCE aggregation level for a search space configured through a base control resource set may be predefined in the specification. The CCE aggregation level may be configured to 1, 2, 4, 8, or the like. For high-reliability transmission such as URLLC, the CCE aggregation level may be set to a value greater than 8 (e.g., 16). In order to improve the resource utilization efficiency, the CCE aggregation level may be set to an even number (e.g., 6, 10, etc.) instead of an exponential value of 2.

Variable Search Space

The control resource set may be configured within a limited specific frequency region. On the other hand, a frequency region used for data transmission may be wider than the specific frequency band in which the control resource set is configured. Therefore, an operation frequency range of the terminal may be adjusted to reduce the power consumption of the terminal. For example, the terminal may perform signal reception operations in a reduced bandwidth (e.g., narrow band) to monitor a downlink control channel and may perform data transmission and reception operations in an increased bandwidth (e.g., wide band) to transmit and receive data. Through this, power consumption in an RF module of the terminal may be reduced by lowering an analog-to-digital converter (ADC) sampling rate, a FFT size, or the like in the downlink control channel reception procedure. The time required for the terminal to retune the RF frequency from the wide band to the narrow band may be referred to as '$T_{W,N}$', and the time required for the terminal to retune the RF frequency from the narrow band to the wide band may be referred to as '$T_{N,W}$'. Each of $T_{W,N}$ and $T_{N,W}$ may be increased when the center frequency is changed.

The terminal may change the operation frequency range using an interval in which no signal is transmitted (e.g., an unscheduled data channel, a TDD guard interval, etc.). Also, a gap may be defined for changing the operation frequency range of the terminal. The terminal may change the operation frequency range without performing transmission and reception of signals in the gap, and may tune the RF module. The gap may be configured by an explicit method or an implicit method.

The gap may be comprised of consecutive slots, consecutive minislots, or consecutive OFDM symbols. Each of $T_{W,N}$ and $T_{N,W}$ may be configured within several to several tens of microseconds. For example, 20 μs may be needed to adjust the operation frequency range of the terminal. When the subcarrier spacing is 15 kHz, the gap may be set shorter than one OFDM symbol length because 20 μs corresponds to ⅓ of one OFDM symbol length.

Since a peak data rate and spectral efficiency of the terminal can be improved as the gap is shorter, $T_{W,N}$ and $T_{N,W}$ may be set shorter than one OFDM symbol length. The gap used to adjust the operation frequency range from a wide band to a narrow band may be referred to as a 'first gap'; and the length of the first gap may be referred to as '$G_{W,N}$'. The gap used to adjust the operation frequency range from a narrow band to a wide band may be referred to as a 'second gap'; and the length of the second gap may be referred to as '$G_{N,W}$'.

For a sub symbol-level gap (i.e., a gap shorter than the length of one OFDM symbol) used for adjusting the operation frequency range of the terminal, a short OFDM symbol may be configured according to the increase of the subcarrier spacing. For example, when the subcarrier spacing is changed from 15 kHz to 30 kHz, the length of one OFDM symbol at the subcarrier spacing 15 kHz corresponds to the length of 2 OFDM symbols at the subcarrier spacing 30 kHz, so that one of the 2 OFDM symbols at the subcarrier spacing 30 kHz may be used as the gap, and the other OFDM symbol may be used for transmission and reception of a signal.

Some regions of the time period of the control resource set or the REG pool belonging to the control resource set (hereinafter collectively referred to as 'control resource set') may be used as a gap. Here, the control resource set may be configured in the narrow band, and a data region (e.g., a resource region of the PDSCH, a resource region of the PUSCH, etc.) may be configured in the narrow band or the wide band. In this case, a first gap may be located in the front region of the control resource set on the time domain, and a second gap may be located on the rear region of the control resource set on the time domain.

FIG. 12 is a conceptual diagram illustrating a first embodiment of a method of configuring a data region and a control region.

Referring to FIG. 12, a narrow band downlink control region (e.g., control resource set) may be configured in one slot, and a wide band data region may be configured in one slot. The subcarrier spacing for the data region may be f0, and one slot may comprise 14 OFDM symbols. The downlink control region may be configured to the OFDM symbols #0 and #1. The subcarrier spacing for the downlink control region may be f1, and f1 may be greater than f0. For example, f1 may be two times f0, and in this case the downlink control region may occupy 4 OFDM symbols.

Figure 13A:
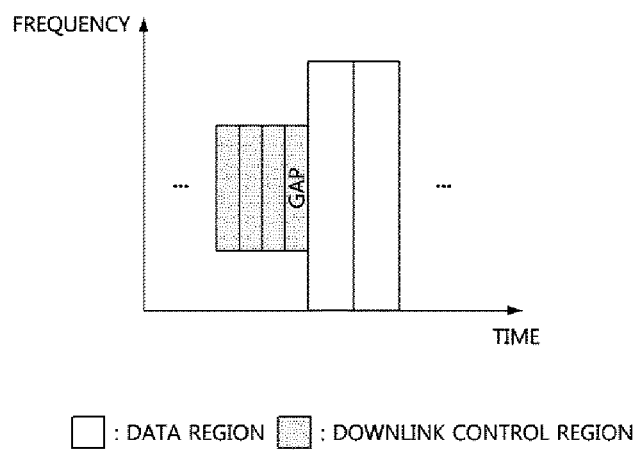
FIG. 13A is a conceptual diagram illustrating a first embodiment of a gap configured in a control region.
Figure 13B:
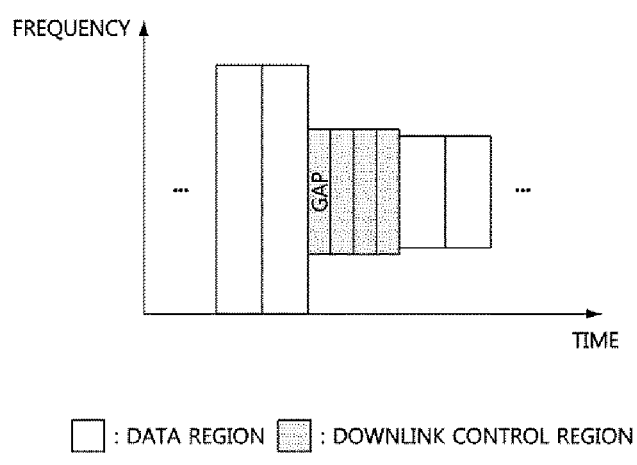
FIG. 13B is a conceptual diagram illustrating a second embodiment of a gap configured in a control region.

FIG. 13A is a conceptual diagram illustrating a first embodiment of a gap configured in a control region, and FIG. 13B is a conceptual diagram illustrating a second embodiment of a gap configured in a control region.

Referring to FIGS. 13A and 13B, a narrow band downlink control region (e.g., control resource set, search space) may be configured, a narrow band or wide data region may be configured, and some of the downlink control region may be configured as a gap. The subcarrier spacing for the data region may be f0, and the subcarrier spacing for the downlink control region may be f1. For example, f1 may be two times f0. In this case, one OFDM symbol in the data region may correspond to 2 OFDM symbols in the downlink control region, and the downlink control region may occupy 4 OFDM symbols.

In FIG. 13A, since a scheduled wide band data region (e.g., a PDSCH resource region) is present after the downlink control region, the terminal may retune the operation frequency band to monitor the wide band data region. Thus, the last OFDM symbol in the downlink control region may be configured as a gap (e.g., a second gap). That is, when the bandwidth of the data region is larger than the bandwidth of the downlink control region, the last OFDM symbol of the downlink control region may be configured as a gap. There may not be a scheduled data region (e.g., a PDSCH resource region) in a previous slot of the downlink control region. In this case, since it is not necessary to monitor the wide band data region in the previous slot of the downlink control region, the bandwidth of the terminal may already be configured to be the narrow band. Alternatively, the bandwidth of the terminal may be changed from the wide band to the narrow band in the previous slot of the downlink control region. Therefore, the first OFDM symbol in the downlink control region may not be configured as a gap.

In FIG. 13B, since a scheduled wide band data region is present in the previous slot of the downlink control region, the first OFDM symbol of the downlink control region may be configured as a gap (e.g., a first gap). There may be a narrow band data region scheduled in a slot to which the down control region belongs. The bandwidth of the data region located in the slot to which the downlink control region belongs may be less than or equal to the bandwidth of the downlink control region. Therefore, the terminal may not retune the operation frequency band to monitor the narrow band data region.

On the other hand, the base station may notify, to the terminal, gap configuration information (e.g., presence of the gap, position of the gap, etc.) through an explicit or implicit signaling procedure. The presence and position of the gap may be implicitly configured according to the presence of the scheduled data region and the frequency band occupied by the scheduled data region in the previous time period or the following time period of the downlink control region. For example, when there is a wide band data region (e.g., a data region occupying a frequency region other than the frequency region occupied by the downlink control region) in the previous time period of the downlink control region, the terminal may estimate P OFDM symbols from the first OFDM symbol in the downlink control region as a gap. Also, when there is a wide band data region (e.g., a data region occupying a frequency region other than the frequency region occupied by the downlink control region) in the subsequent time period of the downlink control region, the terminal may estimate the last Q OFDM symbols of the downlink control region as a gap.

Each of P and Q may be determined based on the numerology of the downlink control region. In FIG. 13A, Q may be set to 1, and in FIG. 13B, P may be set to 1. Each of P and Q may be configured in the terminal through a higher layer signaling procedure. The terminal may retune the operation frequency range in the gap, and may not perform PDCCH monitoring in the gap. When a part of the search spaces in the control resource set is estimated as the gap, the terminal may perform a monitoring operation in remaining search spaces excluding the corresponding gap. Here, the search space may be changed dynamically according to the configuration of the gap.

Meanwhile, the presence and position of the gap may be determined based on the presence of and the frequency region occupied by a physical channel (e.g., physical signal) other than the data region (e.g., PDSCH resource region). The gap may be explicitly defined, or the operation of the terminal in the gap may be defined. For example, the terminal may not perform the blind decoding operation of the PDCCH in the gap, and may not perform a signal reception procedure in the gap. When a scheduled data region (e.g., PDSCH resource region) is present in at least one of the previous time period and the subsequent time period of the control resource set, the terminal that has not acquired a DCI through the control resource set may not receive a data channel. In this case, since the base station determines that there is a gap for the terminal and the terminal determines that there is no gap, the terminal may perform the PDCCH monitoring operation in a wider region. The above-described signaling procedure of the gap configuration information and the estimation procedure of the presence and position of the gap may be applied irrespective of the subcarrier spacing (e.g., subcarrier spacing of the control resource set and the data region), and may be used for the base control resource set as well as the additional control resource set.

Also, some resources of the data region may be configured as a gap. For example, P OFDM symbols from the first OFDM symbol of the data region may be configured as a gap, and the last Q OFDM symbols of the data region may be configured as a gap. The signaling procedure of the gap configuration information of the data region may be the same as or similar to the signaling procedure of the gap configuration information of the control resource set described above and the estimation procedure of the presence and position of the gap of the data region may be the same as or similar to the estimation procedure of the presence and position of the gap of the control resource set described above. For example, the presence and position of the gap in the data region may be configured according to the presence of the scheduled data region and frequency resources occupied by the scheduled data region in the previous time period or the subsequent time period of the downlink control region. Also, the gap may be configured in both the downlink control region and the data region.

Method of Transmitting a Data Channel in a Control Resource Set

The payload size and the number of DCIs transmitted in each monitoring period of a search space configured in a control resource set or a REG pool belonging to the control resource set (hereinafter collectively referred to as a 'control resource set') may be different. When the control resource set and the search space corresponding thereto are semi-statically configured, the resources configured as the control resource set in a specific time period may be wasted. Therefore, not only control information but also a data channel may be transmitted in the control resource set.

Figure 14:
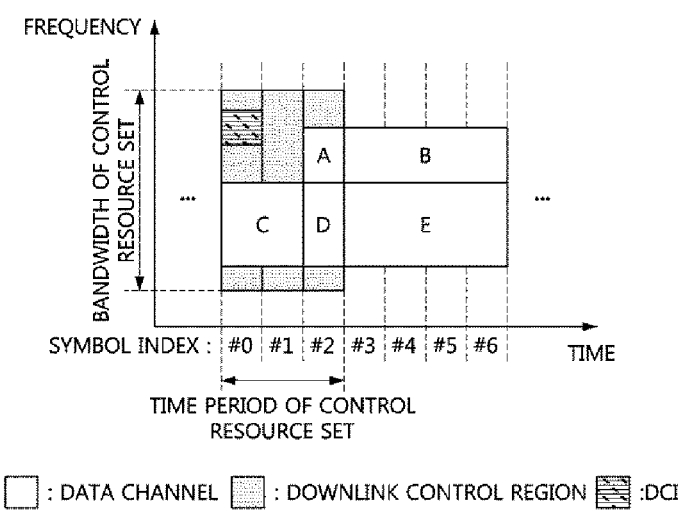
FIG. 14 is a conceptual diagram illustrating a first embodiment of a data channel scheduling method.

FIG. 14 is a conceptual diagram illustrating a first embodiment of a data channel scheduling method.

Referring to FIG. 14, a subcarrier spacing of the control resource set may be equal to a subcarrier spacing of the data channel (e.g., PDSCH), and the base station may transmit a DCI including scheduling information of the data channel to the terminal through the control resource set. The combination of the resource regions scheduled by the DCI may be configured variously. For example, resource regions (B+E) (e.g., a resource region located outside the time period in which the control resource set is located) may be scheduled by the DCI. In order to improve resource efficiency, a resource region (e.g., resource region A, resource region C, resource region D, etc.) within the time period in which the control resource set is located may be scheduled by the DCI.

When resource regions (C+D+E) are scheduled by the DCI, the DCI and the data channel may be transmitted in a frequency division multiplexing (FDM) manner. When resource regions (A+B) or resource regions (A+B+D+E) are scheduled by the DCI, the DCI and the data channel may be transmitted in a TDM manner. When resource regions (D+E) are scheduled by the DCI, a time-frequency resource occupied by the DCI may be different from a time-frequency resource occupied by the data channel. Each of the resource regions A, B, C, D, and E may be configured with at least one PRB, and the base station may transmit scheduling information (e.g., the number of PRBs included in the data channel, the position of the starting OFDM symbol of the data channel, etc.) of the data channel (e.g., data channel configured as a combination of resource regions) to the terminal through a signaling procedure.

For example, the base station may transmit to the terminal a DCI including information indicating the position of the starting OFDM symbol of the data channel. Here, the DCI may be a UE-specific DCI including the scheduling information of the data channel. That is, the corresponding DCI format may include a CRC scrambled with a C-RNTI. The information indicating the position of the starting OFDM symbol of the data channel may be an index in a slot or a minislot of the starting OFDM symbol of the data channel, an offset (hereinafter referred to as a 'symbol offset') between the starting OFDM symbol of the data channel and any one OFDM symbol among the OFDM symbols in which the DCI is transmitted, or the like. The method in which the position of the starting OFDM symbol of the data channel is indicated by the index in the slot or minislot of the starting OFDM symbol of the data channel may be referred to as 'Method 900-1', and the method in which the position of the starting OFDM symbol of the data channel is indicated by the symbol offset may be referred to as 'Method 900-2'.

In Method 900-1, when a slot is composed of N OFDM symbols, the index in the slot of the OFDM symbol may be one of values from 0 to N−1. In Method 900-1, when a minislot is composed of M OFDM symbols, the index in the minislot of the OFDM symbol may be one of values from 0 to M−1. In Method 900-2, any one OFDM symbol among the OFDM symbol(s) in which the DCI is transmitted may be a first OFDM symbol, a last OFDM symbol, an OFDM symbol immediately following the last OFDM symbol, or the like among the OFDM symbol(s) in which the DCI is transmitted. In Method 900-2, the offset between OFDM symbols may mean a difference between the time domain indices of the OFDM symbols.

On the other hand, the subcarrier spacing of the control resource set may be configured to be different from the subcarrier spacing of the data channel. In this case, a numerology used to indicate the position of the starting OFDM symbol of the data channel may be defined.

Figure 15:
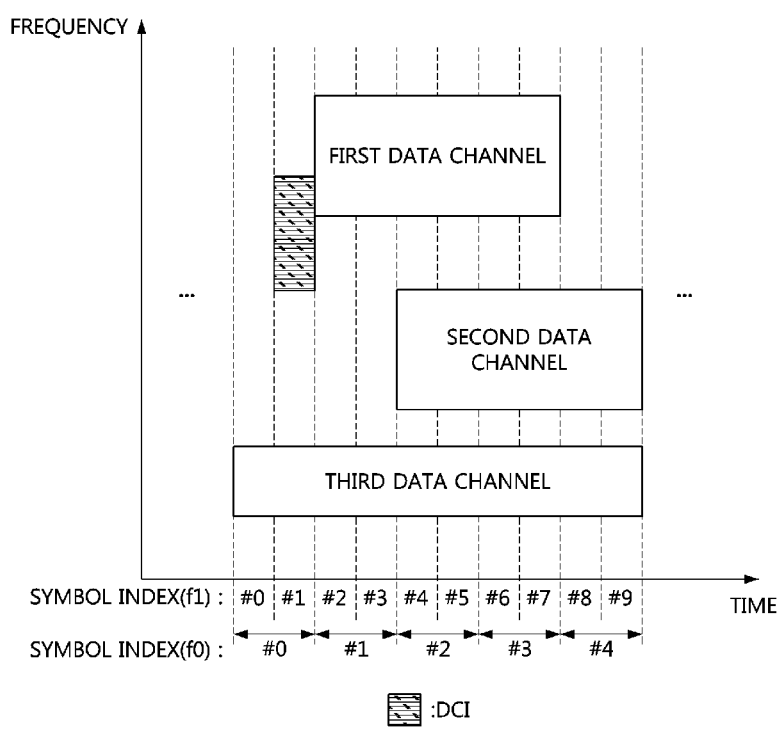
FIG. 15 is a conceptual diagram illustrating a second embodiment of a data channel scheduling method.

FIG. 15 is a conceptual diagram illustrating a second embodiment of a data channel scheduling method.

Referring to FIG. 15, the subcarrier spacing of the DCI (i.e., the control channel over which the DCI is transmitted) may be configured to be different from the subcarrier spacing of the data channel (e.g., PDSCH). The subcarrier spacing of the data channel may be f0. In this case, a first data channel may start at the OFDM symbol #1, a second data channel may start at the OFDM symbol #2, and a third data channel may start at the OFDM symbol #0. The subcarrier spacing of the DCI including the scheduling information of the data channel may be set to f1. In this case, the DCI may be transmitted in the OFDM symbol #1. Here, f1 may be greater than f0, and one OFDM symbol at f0 may correspond to 2 OFDM symbols at f1. For example, f0 may be 15 kHz, f1 may be 30 kHz, and the same CP overhead may be applied to f0 and f1.

The base station may transmit a DCI including information indicating the OFDM symbols #1, #2 and #0 of f0 to the terminal in order to schedule the data channel. Alternatively, an index of the OFDM symbol (e.g., OFDM symbol #1) of f1 in which the DCI is transmitted may be translated into an OFDM symbol index of f0 (e.g., OFDM symbol #0). For example, when the OFDM symbol index of f1 is N1 and the OFDM symbol index of f0 corresponding to N1 is N0, an equation N0=floor (N1/(f1/f0)) may be defined. The base station may transmit a DCI including a symbol offset indicating the difference between the translated OFDM symbol index of the DCI and the starting OFDM symbol index of the data channel to the terminal. In the second embodiment of FIG. 15, the symbol offset may indicate 1, 2, and 0.

When the data channel is scheduled in multiple slots by a DCI, Methods 900-1 and 900-2 may be used. The position of the starting OFDM symbol of the data channel may be set equal in each of the slots in which the data channel is scheduled. When a control resource set located in a specific slot is configured as a zero-power control resource set described below, the data channel may be transmitted by being rate-matched to the control resource set in the corresponding slot. Also, when the data channel is cross-slot-scheduled by a DCI, Methods 900-1 and 900-2 may be used. Here, the starting OFDM symbol of the data channel may be a specific OFDM symbol in the slot in which the data channel is scheduled.

Meanwhile, in Method 900-1 and Method 900-2, candidates of the starting OFDM symbol of the data channel may be configured in the terminal by a higher layer signaling procedure (e.g., RRC signaling procedure). For example, the base station may inform the terminal of the candidates of the starting OFDM symbol of the data channel through a higher layer signaling procedure, and transmit to the terminal a DCI indicating a candidate of the starting OFDM symbol among the candidates of the starting OFDM symbol configured by the higher layer signaling procedure. When the candidates of the starting OFDM symbol of the data channel configured by the higher layer signaling procedure are only one, the candidate of the starting OFDM symbol of the corresponding data channel may not be dynamically indicated by the DCI, but may be used semi-statically as the starting OFDM symbol of the data channel.

When the data channel allocated to the terminal includes discontinuous OFDM symbols in the time domain, the resource region of the data channel may be represented by a set of OFDM symbols to which the data channel is mapped. In this case, the starting OFDM symbol of the data channel may indicate the first OFDM symbol among the OFDM symbols to which the data channel is mapped.

Methods 900-1 and 900-2 may be used for slot-based data channel scheduling. When one slot includes 14 OFDM symbols (e.g., OFDM symbols #0 to #13) and Method 900-1 is used, the index candidates in the slot of the starting OFDM symbol of the data channel are OFDM Symbols #0 to #13. On the other hand, when Method 900-2 is used, the starting OFDM symbol of the data channel is indicated by the offset between the last OFDM symbol and the starting OFDM symbol of the data channel among the OFDM symbol (s) in which DCI is transmitted, the candidates of the symbol offset may be −K to (13−K). Here, K may be the index in the slot of the last OFDM symbol among the OFDM symbol(s) in which the DCI is transmitted. For example, when the DCI is transmitted in the OFDM symbols #2 and #3, the candidate of the starting OFDM symbol may be between −3 and 10.

Methods 900-1 and 900-2 may be used for minislot-based data channel scheduling. The minislot-based data channel scheduling may be performed based on two methods. In the first method, the base station may explicitly inform the terminal of configuration information of a minislot.

Figure 16:
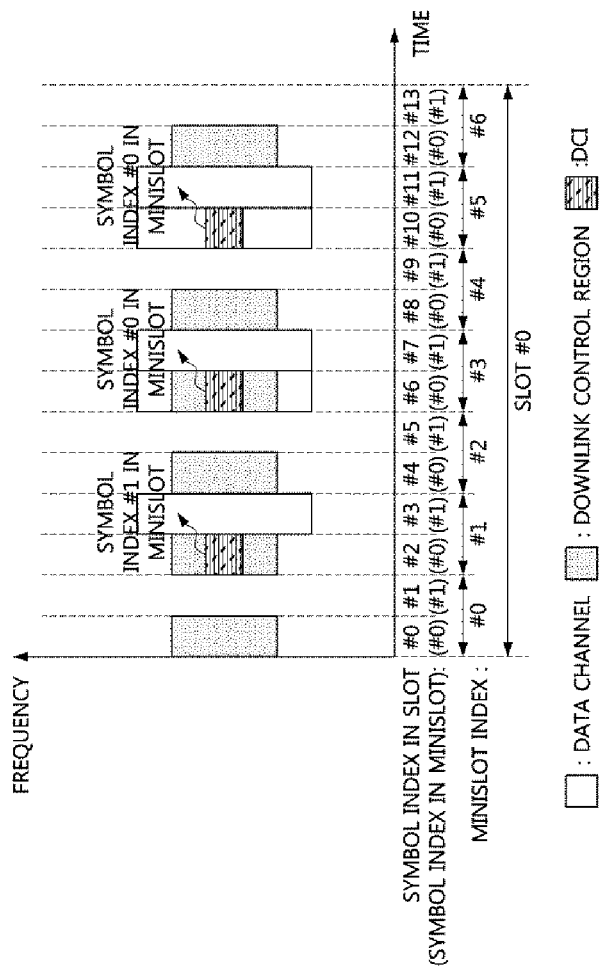
FIG. 16 is a conceptual diagram illustrating a third embodiment of a data channel scheduling method.

FIG. 16 is a conceptual diagram illustrating a third embodiment of a data channel scheduling method.

Referring to FIG. 16, one slot may comprise 14 OFDM symbols, and one minislot may comprise 2 OFDM symbols. In this case, configuration information of the minislot transmitted to the terminal may indicate that 7 minislots each of which comprises 2 OFDM symbols are configured in one slot. The OFDM symbol indexes within each minislot may be defined as #0 and #1.

The OFDM symbol index in the minislot may be used for configuring the PDCCH monitoring period and cycle. In the third embodiment of FIG. 16, the base station may inform the terminal that the control resource set or the search space is located in the OFDM symbol #0 in each minislot and that the monitoring period for the search space corresponds to 2 OFDM symbols (i.e., minislot length). Also, according to Method 900-1, the base station may inform the terminal of the starting OFDM symbol of the data channel using the OFDM symbol index in the minislot.

Referring to FIG. 16, according to Method 900-1, in the minislot #1, the DCI may indicate that the starting OFDM symbol of the data channel corresponds to the OFDM symbol index #1 in the same minislot (i.e., minislot #1). In the minislot #4, the DCI may indicate that the starting OFDM symbol of the data channel corresponds to the OFDM symbol index #0 in the same minislot (i.e., minislot #4). In this case, in the minislot #4, the data channel may be rate-matched to the control resource set. In the minislot #6, the DCI may indicate that the starting OFDM symbol of the data channel corresponds to the OFDM symbol index #0 in the same minislot (i.e., minislot #6). In this case, in the minislot #6, the data channel may be rate-matched to the DCI.

On the other hand, in the second method of minislot-based data channel scheduling, configuration of the PDCCH monitoring period and time-domain resource allocation of the data channel can be performed in units of symbol without explicitly defining or configuring a minislot, so that an equivalent or similar effect as the method based on an explicit minislot can be provided.

Figure 17:
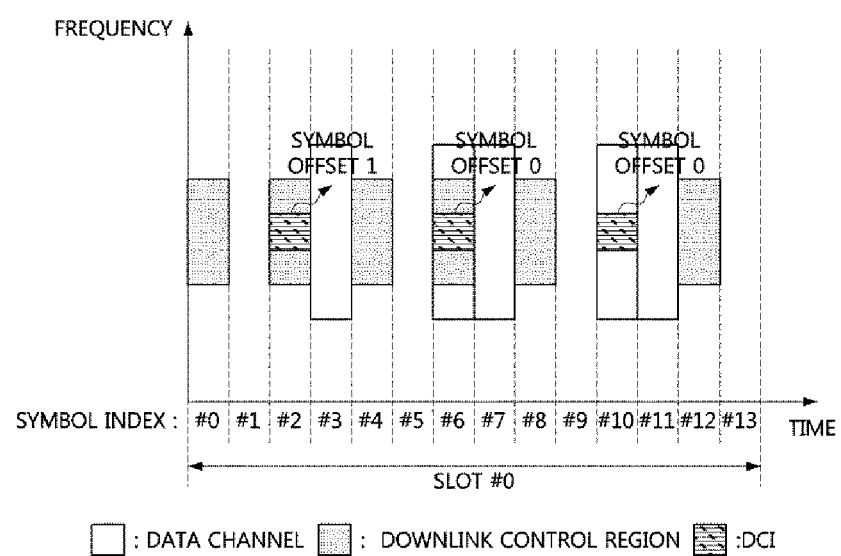
FIG. 17 is a conceptual diagram illustrating a fourth embodiment of a data channel scheduling method.

FIG. 17 is a conceptual diagram illustrating a fourth embodiment of a data channel scheduling method.

Referring to FIG. 17, one slot may comprise 14 OFDM symbols, and configuration information of a minislot may not be explicitly signaled to the terminal. Instead, the base station may configure the terminal to monitor the control resource set or the search space in odd-numbered OFDM symbols (e.g., OFDM symbols #0, #2, #4, #6, #8, #10, and #12). In this case, according to Method 900-2, the base station may transmit to the terminal an offset between one OFDM symbol (e.g., the first OFDM symbol or the last OFDM symbol) among the OFDM symbol(s) in which the DCI is transmitted and the starting OFDM symbol of the data channel through the DCI scheduling the data channel. When the data channel is allocated to the same OFDM symbol position as in the third embodiment of FIG. 16, the symbol offset may be 0 or 1. The candidate value(s) of the symbol offset may be predefined in the specification or configured in the terminal by a higher layer signaling procedure.

For example, when the symbol offset is defined on the basis of the first OFDM symbol among the OFDM symbol(s) in which the DCI is transmitted and the symbol offset indicated by the DCI is 0 according to Method 900-2, the terminal may determine that the data channel starts from the first OFDM symbol among the OFDM symbol(s) in which the DCI is transmitted. For example, the DCI transmitted in the OFDM symbol #6 may include a symbol offset 0 and inform the terminal that the data channel starts from the OFDM symbol #6. Also, the DCI transmitted in the OFDM symbol #10 may include a symbol offset 0, and may inform the terminal that the data channel starts from the OFDM symbol #10. As another example, when the symbol offset is defined on the basis of the first OFDM symbol among the OFDM symbol(s) in which the DCI is transmitted and the symbol offset indicated by the DCI is 1 according to Method 900-2, the terminal may determine that the data channel starts from the next OFDM symbol of the first OFDM symbol among the OFDM symbol(s) in which the DCI is transmitted. For example, the DCI transmitted in the OFDM symbol #2 may include a symbol offset 1 and inform the terminal that the data channel starts from the OFDM symbol #3.

On the other hand, when the explicit minislot structure is not present, the use of Method 900-1 may be undesirable when the PDCCH monitoring period of the terminal is shorter than the slot length. For example, when the minislot-based scheduling described with reference to FIG. 17 is performed based on Method 900-1, the DCIs of the symbols #2, #6, and #10 may include information indicating the starting symbols #3, #6, and #10 of the PDSCH, respectively. This may require a greater amount of DCI than Method 900-2 which indicates either 0 or 1.

Meanwhile, in order to prepare for blockage of a link (e.g., a beam pair link (BPL)) formed by combining a transmission beam of the base station and a reception beam of the terminal in a multi-beam scenario, the base station may transmit the DCI for scheduling one data channel (e.g., PDSCH) to the terminal multiple times using a plurality of control channels (e.g., PDCCHs). In this case, in each of the plurality of control channels, a resource allocation (e.g., CCE aggregation level), a channel coding rate, a reception beam (e.g., a quasi-co-location (QCL) configuration for spatial reception parameters), or the like may be different. In order to simplify hybrid automatic repeat request (HARM) process management, the plurality of control channels may be transmitted in the same slot. When the number of reception RF chains of the terminal is small, the plurality of control channels may be transmitted through different OFDM symbols in the same slot.

Figure 18:
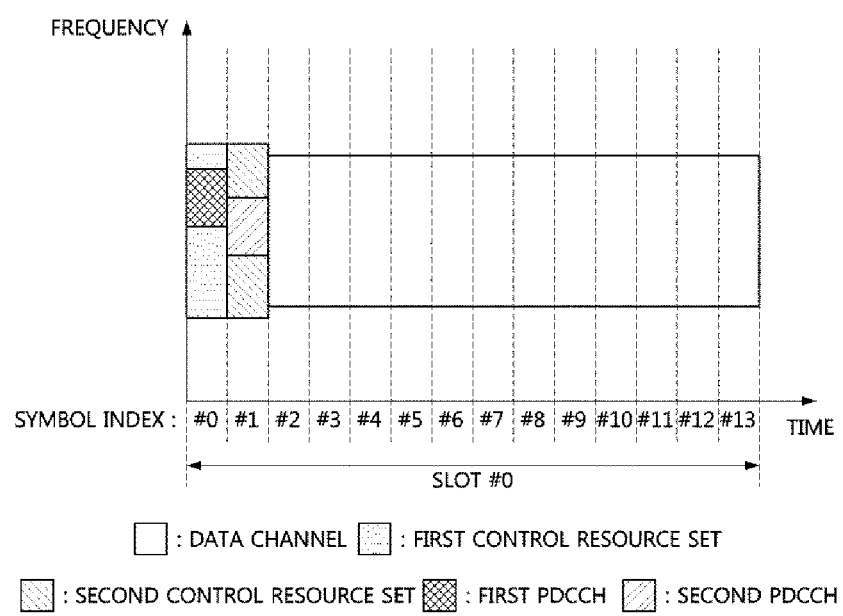
FIG. 18 is a conceptual diagram illustrating a first embodiment of a scheduling method in a multi-beam scenario.

FIG. 18 is a conceptual diagram illustrating a first embodiment of a scheduling method in a multi-beam scenario.

Referring to FIG. 18, a plurality of PDCCHs may include a first PDCCH and a second PDCCH, the first PDCCH may be transmitted through a first control resource set located in the OFDM symbol #0 or a first search space formed in a first REG pool, and the second PDCCH may be transmitted through a second control resource set located in the OFDM symbol #1 or a second search space formed in a second REG pool. The terminal may receive scheduling information for the same data channel (e.g., PDSCH) through the first PDCCH and the second PDCCH. When the DCI includes information indicating the index in the slot of the starting OFDM symbol of the data channel (e.g., PDSCH) according to Method 900-1, the DCI transmitted through the first PDCCH and the DCI transmitted through the second PDCCH may indicate that the OFDM symbol index #2 corresponds to the starting OFDM symbol of the data channel. In this case, the payload of the DCI transmitted through the first PDCCH may be the same as the payload of the DCI transmitted through the second PDCCH. The terminal may improve the PDCCH reception performance by combining the DCI transmitted through the first PDCCH and the DCI transmitted through the second PDCCH. On the other hand, when the DCI includes an offset (i.e., symbol offset) between one OFDM symbol (e.g., the first OFDM symbol) among the OFDM symbol(s) in which the DCI is transmitted and the starting OFDM symbol of the data channel according to Method 900-2, the symbol offset indicated by the DCI transmitted through the first PDCCH may be 2, and the symbol offset indicated by the DCI transmitted through the second PDCCH may be 1. That is, the symbol offset indicated by each of the first PDCCH and the second PDCCH may be different. In this case, the payload of the DCI transmitted through the first PDCCH may be different from the payload of the DCI transmitted through the second PDCCH. It may be difficult for the terminal to combine and receive the DCI transmitted through the first PDCCH and the DCI transmitted through the second PDCCH.

On the other hand, when the candidates of the starting OFDM symbol of the data channel are configured by a higher layer signaling and one of the candidates of the starting OFDM symbol is indicated by the DCI, the DCI may include a field (hereinafter referred to as a 'symbol indication field') indicating the starting OFDM symbol of the data channel. The symbol indication field may include only information on the starting OFDM symbol of the data channel, and may further include other information besides the information on the starting OFDM symbol of the data channel. For example, the symbol indication field may further include an offset between the slot in which the DCI is transmitted and the slot in which the data channel is transmitted, the length of the time period of the data channel (e.g., the number of OFDM symbols), the time-domain position information of the DMRS for decoding the data channel, and the like.

The size of the symbol indication field (e.g., the number of bits) may be configured in the terminal by a higher layer signaling, or determined based on the number of candidates of the starting OFDM symbol of the data channel configured by a higher layer signaling. For example, if the number of candidates of the starting OFDM symbol of the data channel is P, the number of bits of the symbol indication field may be determined as ceil($\log_2(P)$). Here, ceil(x) is a function that outputs the minimum value among integers greater than or equal to x. When the symbol indication field further includes other information besides the starting OFDM symbol of the data channel, combination(s) of the candidates of the starting OFDM symbol of the data channel and the candidates of other information may be set in the terminal by a higher layer signaling, and in this case, the size of the symbol indication field may be determined by the number of the combinations of the candidates of the starting OFDM symbol of the data channel and the candidates of other information configured by the higher layer signaling. For example, when the number of combinations is S, the number of bits of the symbol indication field may be set to ceil($\log_2(S)$). When the symbol indication field includes at least the information on the starting OFDM symbol of the data channel and the length of the time period of the data channel, and the candidates of the starting OFDM symbol of the data channel and the candidates of the length of the time period of the data channel are transmitted through the higher layer signaling, the candidates of the starting OFDM symbol and the length of the time period may be jointly encoded in order to configure various candidate combinations with minimal signaling overhead. For example, the candidate of the starting OFDM symbol of the data channel and the candidate of the length of the time period of the data channel may correspond to one indicator value in one-to-one manner according to a specific rule, and the indicator value may be configured in the terminal by a higher layer signaling. Alternatively, the size of the symbol indication field may be predefined in the specification as a fixed value.

Each of the above-described Methods 900-1 and 900-2 may be suitable for different scenarios. One of Methods 900-1 and 900-2 may be configured to the terminal through a signaling procedure, and the starting OFDM symbol of the data channel may be dynamically indicated to the terminal by the method configured in accordance with the signaling procedure. Here, the signaling procedure may include a physical layer signaling procedure (e.g., a DCI transmission procedure), a MAC signaling procedure, an RRC signaling procedure, and the like. The signaling procedure may be performed explicitly or implicitly.

When the signaling procedure is explicitly performed, the terminal may be configured to use only one of Methods 900-1 and 900-2. Alternatively, Methods 900-1 and 900-2 may be configured together in the terminal. For example, the terminal may be configured to use one of Methods 900-1 and 900-2 for each carrier or each bandwidth part. Alternatively, the terminal may be configured to use one of Methods 900-1 and 900-2 for each control resource set or search space.

When the signaling procedure is implicitly performed, one of Methods 900-1 and 900-2 may be configured by setting the time-domain position information of the DMRS for decoding the data channel. For example, the terminal may assume that Method 900-1 is used when the first OFDM symbol to which the DMRS for decoding the data channel is mapped is set to a specific OFDM symbol (e.g., the third or fourth OFDM symbol) of the slot. Also, the terminal may assume that Method 900-2 is used when the first OFDM symbol to which the DMRS for decoding the data channel is mapped is set to a specific OFDM symbol (e.g., the first OFDM symbol) of the data channel.

Alternatively, when the signaling procedure is implicitly performed, one of Methods 900-1 and 900-2 may be configured by setting a monitoring period of the control resource set or the search space. For example, when the monitoring period of the control resource set or the search space is configured in units of the slot (e.g., one or more slots), the terminal may assume that Method 900-1 is used for the data channel scheduled through the control resource set or the search space. Also, when the monitoring period of the control resource set or the search space is configured in units of the symbol (e.g., less than one slot), the terminal may assume that Method 900-2 is used for the data channel scheduled through the control resource set or the search space.

Meanwhile, the base station may configure at least one bandwidth part for the terminal, and inform the terminal through a signaling procedure of the information on the at least one configured bandwidth part. The bandwidth part may be a set of consecutive PRBs, and at least one PRB in the bandwidth part may be used as a data channel (e.g., PDSCH or PUSCH). The terminal may be configured to have a downlink bandwidth part and an uplink bandwidth part, respectively. Different bandwidth parts may be configured according to application services supported by the terminal. For example, a first bandwidth part may be configured for the eMBB service, and a second bandwidth part may be configured for the URLLC service. In this case, the terminal may transmit or receive an eMBB service related signal through the first bandwidth part and an URLLC service related signal through the second bandwidth part.

A plurality of bandwidth parts configured for the same terminal or different terminals may overlap each other. When the plurality of bandwidth parts are configured for the terminal, the higher layer signaling procedure for Method 900-1 and Method 900-2 may be performed for each bandwidth part. For example, a large number of candidates for the starting OFDM symbol of the data channel may be configured for the slot-based data channel scheduling within the first bandwidth part, and a small number of candidates for the starting OFDM symbol of the data channel may be configured for the minislot-based data channel scheduling within the second bandwidth part.

The size of the symbol indication field of the DCI may be different for each bandwidth part in which the corresponding DCI is transmitted. In the case of the above-described embodiment, the size of the DCI symbol indication field of the first bandwidth part may be larger than the size of the DCI symbol indication field of the second bandwidth part. The higher layer signaling procedure may be configured for each control resource set or search space. When a plurality of search spaces are configured for the terminal, the terminal may be configured with a set of candidates of the starting OFDM symbol of the data channel through the higher layer signaling procedure in each of the plurality of search spaces.

The Methods 900-1 and 900-2 described above may be used for scheduling uplink data channels (e.g., PUSCHs) as well as scheduling downlink data channels (e.g., PDSCHs). For example, in the downlink transmission procedure in which each of Methods 900-1 and 900-2 is applied, the signaling method may be applied to the uplink transmission procedure. Here, the DCI including uplink scheduling information may be used.

Zero Power Control Resource Set

The base station may configure a zero power control resource set or a zero power REG pool (hereinafter collectively referred to as a 'zero power control resource set'), and inform the terminal of the configured zero power control resource sets through a signaling procedure. The zero power control resource set may indicate a control resource set in which a search space is not defined or configured. The terminal may not expect that a PDCCH for itself is transmitted in the zero power control resource set. Therefore, the terminal may not perform a PDCCH monitoring within the zero power control resource set.

When the control resource set is configured in the UE-specific manner, control resource sets configured for the respective plurality of terminals may occupy independent resource regions. In this case, a zero power control resource set may be configured to protect the transmission of control resource sets of other terminals. When a resource region of a scheduled data channel (e.g., PDSCH) includes at least a part of the zero power control resource set configured for the terminal, the terminal may receive the corresponding data channel by rate-matching the data channel around the zero power control resource set. That is, the terminal may determine that the data channel is transmitted through the remaining resource region excluding the zero power control resource set. Also, when the zero power control resource set is used for rate matching of the data channel, the terminal may be configured to monitor the DCI in the zero power control resource set. Alternatively, for the terminal, the control resource set configured for the DCI monitoring may be configured to as the zero power control resource set. The terminal may monitor the DCI in the control resource set configured as the zero power control resource set, and may rate-match the data channel (e.g., PDSCH) to the zero power control resource set. In this case, the base station may inform the terminal of the ID of the control resource set configured as the zero power control resource set through a signaling procedure (e.g., RRC signaling). The ID of the control resource set may be included in the configuration information of the control resource set, and the terminal may receive the ID when the control resource set is configured from the base station. The signaling procedure for configuring the control resource set and the signaling procedure for configuring the zero power control resource set may be separated. When the control resource set includes a plurality of REG pools, a zero power REG pool may be configured for each REG pool for rate matching of the data channel. The base station may inform the terminal of the ID of the REG pool configured as the zero power REG pool and/or the ID of the control resource set to which the corresponding REG pool belongs through a signaling procedure (e.g., RRC signaling).

Search Space Switching

When a plurality of control resource sets or search spaces formed in the control resource set (collectively referred to as 'search space') are configured for one terminal, the search space monitored by the terminal may be dynamically switched (hereinafter referred to as a 'Method 1000'). For example, the base station may configure a plurality of search spaces for the terminal in different frequency bands and switch dynamically the search space monitored by the terminal. Therefore, a frequency diversity gain or a scheduling gain for transmission of the control channel may be obtained.

The search space monitored by the terminal may be explicitly or implicitly configured or indicated to the terminal. In the method of explicitly configuring the search space, the base station may inform the terminal of the search space in slot(s) after the current slot (or slots consecutive with the current slot) using a DCI of the current slot (hereinafter referred to as a 'Method 1000-1'). In the method of implicitly configuring the search space, the terminal may monitor the search space configured in the frequency region closest to the frequency region allocated the data channel in a previous slot (hereinafter referred to as a 'Method 1000-2'). Method 1000-2 may be applied when the transmission quality of the scheduled data channel is good.

In another embodiment of the method of implicitly configuring the search space, the base station may configure a plurality of bandwidth parts for the terminal, and configure a control resource set (or search space) for each bandwidth part. The terminal may monitor the search space configured in an active bandwidth part. In this case, the base station may dynamically switch the search space monitored by the terminal by an implicit method by dynamically instructing the terminal to switch the active bandwidth part.

For example, the base station may configure a first bandwidth part and a second bandwidth part to the terminal, and configure a first search space and a second search space in the first bandwidth part and the second bandwidth part, respectively. When the first bandwidth part of the terminal is active, the terminal may monitor the first search space logically associated with the first bandwidth part. In this case, the base station may dynamically instruct the terminal to deactivate the first bandwidth part and activate the second bandwidth part (i.e., switch the active bandwidth part). By the instruction, the terminal may monitor (i.e., switch the search space for monitoring) the second search space logically associated with the second bandwidth part.

For example, the base station may inform the terminal of a bandwidth part to be activated in slot(s) after the current slot (or slots consecutive with the current slot) using the DCI of the current slot, and the terminal may dynamically switch the current search space to the search space corresponding to the corresponding bandwidth part. When the minislot based (i.e., symbol-level) search space monitoring is considered, dynamic switching of the search space may be applied within one slot.

Although the base station instructs the terminal to switch the search space through the DCI according to Method 1000-1 or 1000-2, if the terminal does not acquire the corresponding DCI, the terminal may monitor a wrong search space. In order to address this problem, the terminal may support a fallback operation to monitor a specific search space at a specific time resource (e.g., specific slot(s)) regardless of the switching instruction for the search space.

For example, the terminal may receive the DCI by monitoring a preconfigured search space for each preconfigured period and time resource. The preconfigured search space may be a search space corresponding to a specific bandwidth part (e.g., a default bandwidth part).

Two-Step DCI Transmission Method

The DCI may be transmitted to the terminal through a plurality of steps. For example, a UE-specific DCI including downlink scheduling information or uplink scheduling information may be transmitted to the terminal through two steps. A DCI transmitted through the first step may be referred to as a 'first DCI', and a DCI transmitted through the second step may be referred to as a 'second DCI'.

For example, the first DCI may include resource configuration information of a data channel (e.g., PDSCH) and the second DCI may include transmission related information of the data channel (e.g., a modulation and coding scheme (MCS), a redundancy version (RV)), and the like. The first DCI may be transmitted on a control channel (e.g., PDCCH) in the control resource set and the second DCI may be transmitted on a part of the resource region of the data channel scheduled by the first DCI. In this case, the data channel may be rate-matched to the resource region (e.g., PDCCH) to which the second DCI is transmitted. Alternatively, a part of the resource region through which the second DCI is transmitted may belong to the control resource set.

According to the two-step DCI transmission method described above, a part of the control information may be offloaded to the data channel. The second DCI and the data channel may share a DMRS. In this case, the terminal may decode the second DCI using the DMRS for the data channel. Here, the same precoding (e.g., beamforming) may be applied to the second DCI, the data channel and the DMRS. Alternatively, the same reception beam (e.g., QCL for spatial reception parameters) may be configured for the second DCI and the data channel.

Figure 19:
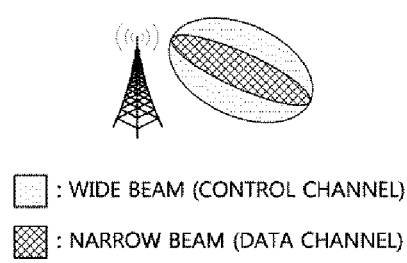
FIG. 19 is a conceptual diagram illustrating a first embodiment of a beamforming transmission method.
Figure 20:
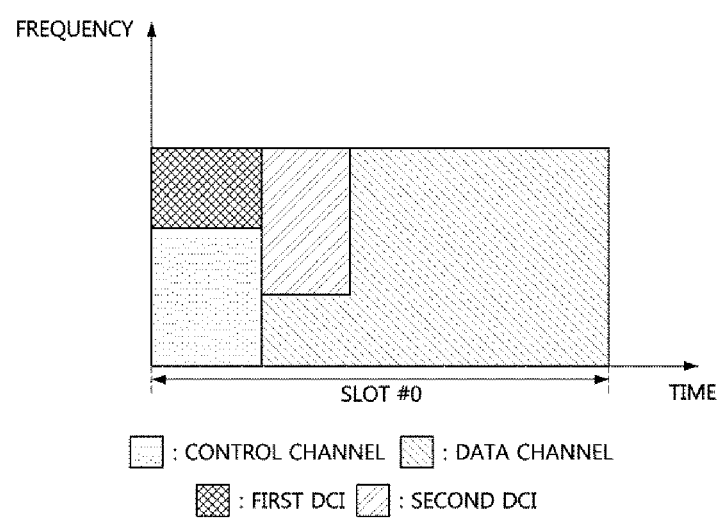
FIG. 20 is a conceptual diagram illustrating a second embodiment of a beamforming transmission method.

FIG. 19 is a conceptual diagram illustrating a first embodiment of a beamforming transmission method, and FIG. 20 is a conceptual diagram illustrating a second embodiment of a beamforming transmission method.

Referring to FIGS. 19 and 20, a control channel (e.g., PDCCH) may be transmitted through a relatively wide beam for high transmission reliability, and a data channel (e.g., PDSCH) may be transmitted through a relatively narrow beam. When the two-step DCI transmission method is used, the first DCI may be transmitted through a relatively wide beam and the second DCI may be transmitted through the same beam (e.g., a relatively narrow beam) as the data channel.

When the scheduling information of the data channel is transmitted through the first DCI and the second DCI, the first DCI is transmitted through a beam wider than that of the data channel, and the second DCI is transmitted through the same beam as the data channel, a negative acknowledgment (NACK) indicating a reception failure of the data channel may be classified into a first NACK and a second NACK. The first NACK may indicate a failure to receive the second DCI and the data channel. The report of the first NACK may be interpreted as a discontinuous transmission (DTX) report for the second DCI. The second NACK may indicate a successful reception of the second DCI and a reception failure of the data channel. When the data channel includes a plurality of transport blocks, the terminal may transmit the first NACK or the second NACK for each of the plurality of transport blocks. When the data channel includes a plurality of code block groups (CBGs), the terminal may transmit the first NACK or the second NACK for each of the plurality of CBGs.

When the first DCI is successfully received, the terminal may transmit the first NACK or the second NACK to the base station at a predetermined time from the reception time of the first DCI. For example, in the case that the first DCI is received in the slot #n, the terminal may transmit the ACK, the first NACK or the second NACK to the base station in the slot #(n+K). The ACK may indicate a successful reception of the data channel. Here, n may be an integer of 0 or more, and K may be an integer of 1 or more.

Even the reception of the first DCI fails, the terminal may transmit the first NACK or the second NACK to the base station if the terminal knows that the second DCI and the PDSCH are transmitted. For example, even when the first DCI is not received in the slot #n, the terminal may determine that the first DCI is transmitted in the slot #n based on specific information (e.g., downlink association index (DAI)) indicated by a DCI received through a slot after the slot #n.

Meanwhile, in the case that the control channel is transmitted through a wide beam, and the second DCI and the data channel are transmitted through a narrow beam, a probability of occurrence of the first NACK is high when inappropriate beamforming is applied to the second DCI and the data channel, and a probability of occurrence of the second NACK may be high when appropriate beamforming is applied to the second DCI and the data channel but the channel quality is low. Here, an average reception error rate (e.g., 1%) of the second DCI may be lower than an average reception error rate (e.g., 10%) of the data channel.

The base station may receive the first NACK or the second NACK from the terminal, and may manage the beam based on the first NACK or the second NACK. When the first NACK is received from the terminal, the base station may interpret that the beam for the data channel is not valid and may perform a procedure for switching the beam for the data channel. For example, the base station may transmit a reference signal for beam measurement to the terminal within a short time from the reception of the first NACK, receive beam measurement information based on the reference signal from the terminal, and instruct the terminal to perform a beam switching operation based on the beam measurement information. When the second NACK is received from the terminal, the base station may interpret that the beam for the data channel is valid and perform a link adaptation procedure (e.g., MCS adjustment, frequency band change of the data channel, etc.) instead of the beam management procedure.

When the first NACK and the second NACK are used, a HARQ feedback for each transport block (or, a code block or a code block group) may be composed of 2 bits. For example, the ACK may be configured as '00', the first NACK may be configured as '01', and the second NACK may be configured as '10'. Here, '11' may indicate different information or may be configured as a reserved field. For example, the reserved field may be configured as trigger information requesting recovery or change of the beam used for transmission of the second DCI or the data channel. Alternatively, the reserved field may be configured as DTX information indicating the reception failure of the first DCI. Alternatively, the reserved field may be used as a third NACK. The third NACK may indicate a reception failure of the second DCI and a successful reception of the data channel.

The HARQ feedback composed of 1 bit may be classified as ACK or NACK, and the NACK may indicate the first NACK or the second NACK. The NACK (e.g., the first NACK or the second NACK) not indicated by the HARQ feedback may be composed of a separate parameter (e.g., a parameter indicating the validity of the beam for the data channel). The separate parameter may be transmitted to the base station with the HARQ feedback. Alternatively, the separate parameter may be transmitted through a signaling procedure. In this case, the transmission time of the separate parameter may be different from the transmission time of the HARQ feedback.

Whether or not the first NACK and the second NACK are used may be configured for each control resource set or search space through a higher layer signaling procedure (e.g., a broadcast information transmission procedure, a UE-specific RRC signaling procedure, etc.). For example, whether to use the first NACK and the second NACK may be configured for the UE-specific search space. When the use of the first NACK and the second NACK is configured semi-statically for each control resource set or search space, the first NACK or the second NACK may be transmitted as the HARQ feedback of the corresponding DCI. Alternatively, the terminal may transmit HARQ feedback for the control resource set or the search space configured by the base station among the control resource sets or search spaces. Alternatively, the base station may transmit information indicating whether the first NACK and the second NACK are used to the terminal through the DCI.

Meanwhile, the 2-step DCI transmission method may be used for scheduling the uplink data channel (e.g., PUSCH). For example, the first NACK or the second NACK may be transmitted in the HARQ response for the uplink data channel.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a user equipment (UE) in a communication system, the operation method comprising:
receiving, from a base station, configuration information of one or more control resource sets, each of the one or more control resource sets including resource element group (REG) pools, each of the REG pools corresponding to one search space in which a physical downlink control channel (PDCCH) monitoring operation is performed, the each of the REG pools being a set of REGs, the REG pools including a first REG pool and a second REG pool included in same control resource set, and a first frequency region of the first REG pool being identical with a second frequency region of the second REG pool;
receiving, from the base station, information indicating a first start symbol of the first REG pool and a second start symbol of the second REG pool, the first start symbol and the second start symbol being different and belonging to a same slot;
receiving, from the base station, rate match information including an index of a first control resource set, to which a rate match operation is applied, among the one or more control resource sets;
performing the PDCCH monitoring operation in a search space corresponding to a REG pool belonging to a second control resource set among the one or more control resource sets;
obtaining, from the base station, downlink control information (DCI) including resource allocation information of a physical downlink shared channel (PDSCH) by the PDCCH monitoring operation; and
obtaining the PDSCH by performing the rate match operation around the indicated first control resource set based on the rate match information,
wherein the configuration information includes an index of each of the one or more control resource sets.

2. The operation method of claim 1, wherein the first control resource set indicated by the rate match information is overlapped with resources of the PDSCH allocated by the DCI.

3. The operation method of claim 1, wherein the configuration information includes information on interleaving to REGs of the one or more control resource sets.

4. The operation method of claim 1, wherein the PDSCH is not received through the first control resource set.

5. The operation method of claim 1, wherein the PDSCH is mapped to resources except for the first control resource set indicated by the rate match information among resources of the PDSCH allocated by the DCI.

6. The operation method of claim 1, wherein the rate match information is received through a higher layer signaling.

7. The operation method of claim 1, wherein the configuration information includes information on frequency resources and time resources of each of the one or more control resource sets.

8. An operation method of a base station in a communication system, the operation method comprising:
transmitting, to a user equipment (UE), configuration information of one or more control resource sets, each of the one or more control resource sets including resource element group (REG) pools, each of the REG pools corresponding to one search space in which a physical downlink control channel (PDCCH) monitoring operation is performed, the each of the REG pools being a set of REGs, the REG pools including a first REG pool and a second REG pool included in same control resource set, and a first frequency region of the first REG pool being identical with a second frequency region of the second REG pool;
transmitting, to the UE, information indicating a first start symbol of the first REG pool and a second start symbol of the second REG pool, the first start symbol and the second start symbol being different and belonging to a same slot;

transmitting, to the UE, rate match information including an index of a first control resource set, to which a rate match operation is applied, among the one or more control resource sets;

transmitting, to the UE, downlink control information (DCI) including resource allocation information of a physical downlink shared channel (PDSCH) in a search space corresponding to a REG pool belonging to a second control resource set among the one or more control resource sets; and transmitting, to the UE, the PDSCH by performing the rate match operation around the indicated first control resource set based on the rate match information, wherein the configuration information includes an index of each of the one or more control resource sets.

9. The operation method of claim 8, wherein the first control resource set indicated by the rate match information is overlapped with resources of the PDSCH allocated by the DCI.

10. The operation method of claim 8, wherein the configuration information includes information on interleaving to REGs of the one or more control resource sets.

11. The operation method of claim 8, wherein the PDSCH is not transmitted through the control resource set.

12. The operation method of claim 8, wherein the PDSCH is mapped to resources except for the first control resource set indicated by the rate match information among resources of the PDSCH allocated by the DCI.

13. The operation method of claim 8, wherein the rate match information is transmitted through a higher layer signaling.

14. The operation method of claim 8, wherein the configuration information includes information on frequency resources and time resources of each of the one or more control resource sets.

* * * * *